US010111068B2

(12) United States Patent
Bharadwaj

(10) Patent No.: US 10,111,068 B2
(45) Date of Patent: Oct. 23, 2018

(54) TECHNIQUES FOR PROVIDING IMS SERVICES TO MULTIPLE MACHINE-TYPE COMMUNICATION DEVICES USING A USER EQUIPMENT AS A PROXY

(71) Applicant: QUALCOMM Incorporated, San Diego, CA (US)

(72) Inventor: Murali Bharadwaj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 38 days.

(21) Appl. No.: 15/224,115

(22) Filed: Jul. 29, 2016

(65) Prior Publication Data
US 2018/0035241 A1    Feb. 1, 2018

(51) Int. Cl.
| H04W 4/06 | (2009.01) |
| H04W 4/70 | (2018.01) |
| H04W 4/00 | (2018.01) |
| H04L 29/06 | (2006.01) |
| H04W 80/04 | (2009.01) |

(52) U.S. Cl.
CPC ........... *H04W 4/70* (2018.02); *H04L 65/1006* (2013.01); *H04L 65/1073* (2013.01); *H04W 4/005* (2013.01); *H04W 80/04* (2013.01)

(58) Field of Classification Search
CPC ........... H04L 65/1006; H04L 65/1073; H04W 4/005; H04W 80/04
See application file for complete search history.

(56) References Cited

U.S. PATENT DOCUMENTS

| 8,064,450 B2* | 11/2011 | Maggenti ............... H04L 12/66 370/392 |
| 2006/0136557 A1* | 6/2006 | Schaedler ............... H04L 29/06 709/203 |
| 2009/0190573 A1* | 7/2009 | Siegel ................. H04L 65/1016 370/352 |
| 2011/0053619 A1* | 3/2011 | Shaheen ................. H04W 4/00 455/466 |
| 2011/0142015 A1* | 6/2011 | Shaikh ............. H04L 29/12641 370/338 |
| 2011/0194459 A1* | 8/2011 | Belinchon Vergara ...................... H04L 29/12188 370/254 |
| 2012/0023238 A1 | 1/2012 | Bouthemy et al. |

(Continued)

FOREIGN PATENT DOCUMENTS

WO    2009155987 A1    12/2009

OTHER PUBLICATIONS

International Search Report and Written Opinion—PCT/US2017/039271—ISA/EPO—dated Sep. 18, 2017.

*Primary Examiner* — Mohamed Kamara
(74) *Attorney, Agent, or Firm* — Dalei Dong; Harrity & Harrity

(57) ABSTRACT

Aspects of the present disclosure generally relate to wireless communications. In some aspects, a user equipment (UE) may receive a plurality of session initiation protocol (SIP) addresses of a plurality of communication devices. The UE and the plurality of communication devices may be associated with a unique domain. The UE may register the plurality of communication devices for an Internet Protocol Multimedia Subsystem (IMS) service. The plurality of communication devices may be registered using a single IMS registration of the UE.

30 Claims, 16 Drawing Sheets

(56) References Cited

U.S. PATENT DOCUMENTS

| | | | |
|---|---|---|---|
| 2012/0071168 A1* | 3/2012 | Tomici | H04W 40/04 455/445 |
| 2013/0308620 A1* | 11/2013 | Bharadwaj | H04W 40/02 370/338 |
| 2014/0098786 A1* | 4/2014 | Yim | H04W 36/0011 370/331 |
| 2015/0163701 A1 | 6/2015 | Yenamandra et al. | |
| 2015/0172879 A1 | 6/2015 | Vaidya et al. | |
| 2015/0222711 A1 | 8/2015 | Huo et al. | |
| 2016/0142467 A1 | 5/2016 | Ban et al. | |
| 2016/0149836 A1 | 5/2016 | Narayanan et al. | |

* cited by examiner

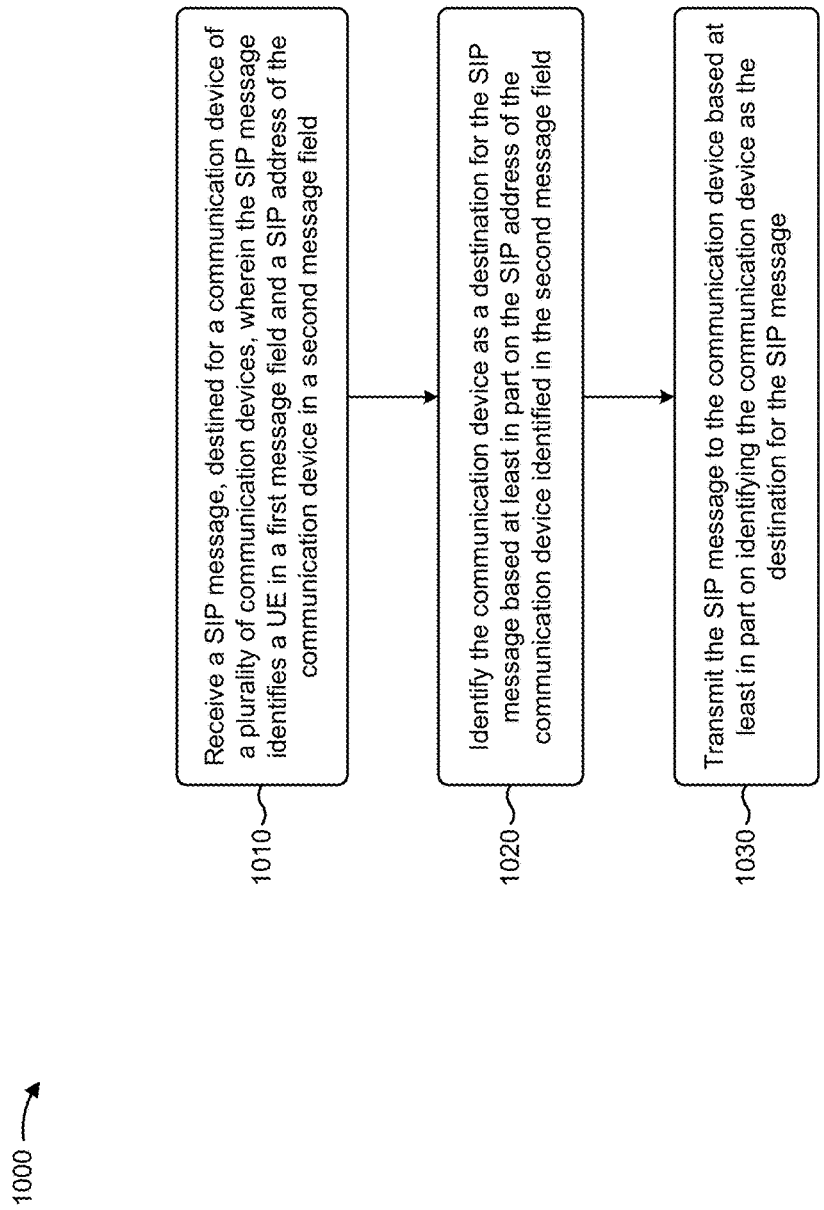

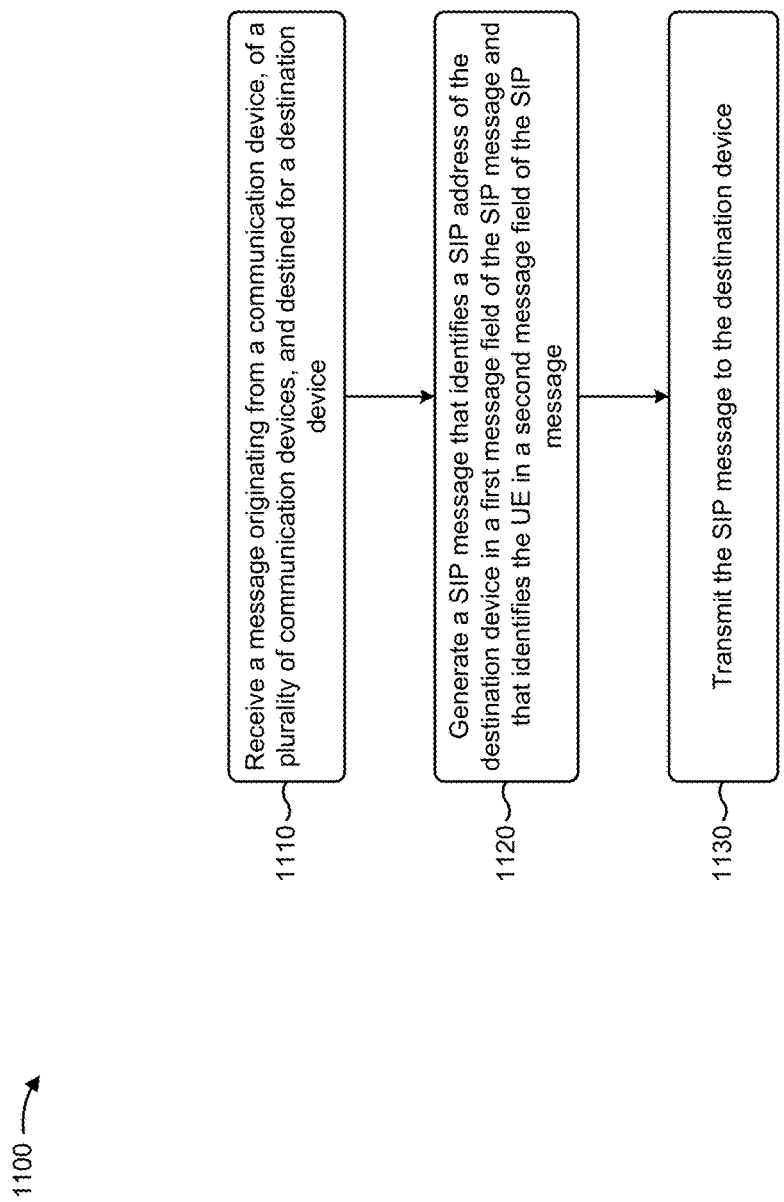

TECHNIQUES FOR PROVIDING IMS SERVICES TO MULTIPLE MACHINE-TYPE COMMUNICATION DEVICES USING A USER EQUIPMENT AS A PROXY

FIELD OF THE DISCLOSURE

Aspects of the present disclosure generally relate to wireless communications, and more particularly to techniques and apparatuses for providing Internet Protocol (IP) Multimedia Subsystem (IMS) services to multiple machine-type communication devices using a user equipment as a proxy.

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of a telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, using new spectrum, and integrating with other open standards using OFDMA on the downlink (DL), SC-FDMA on the uplink (UL), and multiple-input multiple-output (MIMO) antenna technology.

SUMMARY

In some aspects, a method for wireless communication may include receiving, by a user equipment (UE), a plurality of session initiation protocol (SIP) addresses of a plurality of communication devices. The UE and the plurality of communication devices may be associated with a unique domain. The method may include registering, by the UE, the plurality of communication devices for an Internet Protocol Multimedia Subsystem (IMS) service. The plurality of communication devices may be registered using a single IMS registration of the UE.

In some aspects, a UE for wireless communication may include one or more processors to receive a plurality of SIP addresses of a plurality of communication devices. The UE and the plurality of communication devices may be associated with a unique domain. The one or more processors may register the plurality of communication devices for an IMS service. The plurality of communication devices may be registered using a single IMS registration of the UE.

In some aspects, a non-transitory computer-readable medium for wireless communication may store one or more instructions for wireless communication. The one or more instructions, when executed by one or more processors of a UE, may cause the one or more processors to receive a plurality of SIP addresses of a plurality of communication devices. The UE and the plurality of communication devices may be associated with a unique domain. The one or more instructions may cause the one or more processors to register the plurality of communication devices for an IMS service. The plurality of communication devices may be registered using a single IMS registration of the UE.

In some aspects, an apparatus for wireless communication may include means for receiving a plurality of SIP addresses of a plurality of communication devices. The apparatus and the plurality of communication devices may be associated with a unique domain. The apparatus may include means for registering the plurality of communication devices for an IMS service. The plurality of communication devices may be registered using a single IMS registration of the apparatus.

Aspects generally include a method, apparatus, system, computer program product, non-transitory computer-readable medium, and user equipment as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 10 is a flow diagram of another example process for providing IMS services to multiple machine-type communication devices using a user equipment as a proxy, in accordance with various aspects of the present disclosure; and FIG. 11 is a flow diagram of another example process for providing IMS services to multiple machine-type communication devices using a user equipment as a proxy, in accordance with various aspects of the present disclosure.

DETAILED DESCRIPTION

Figure 1:
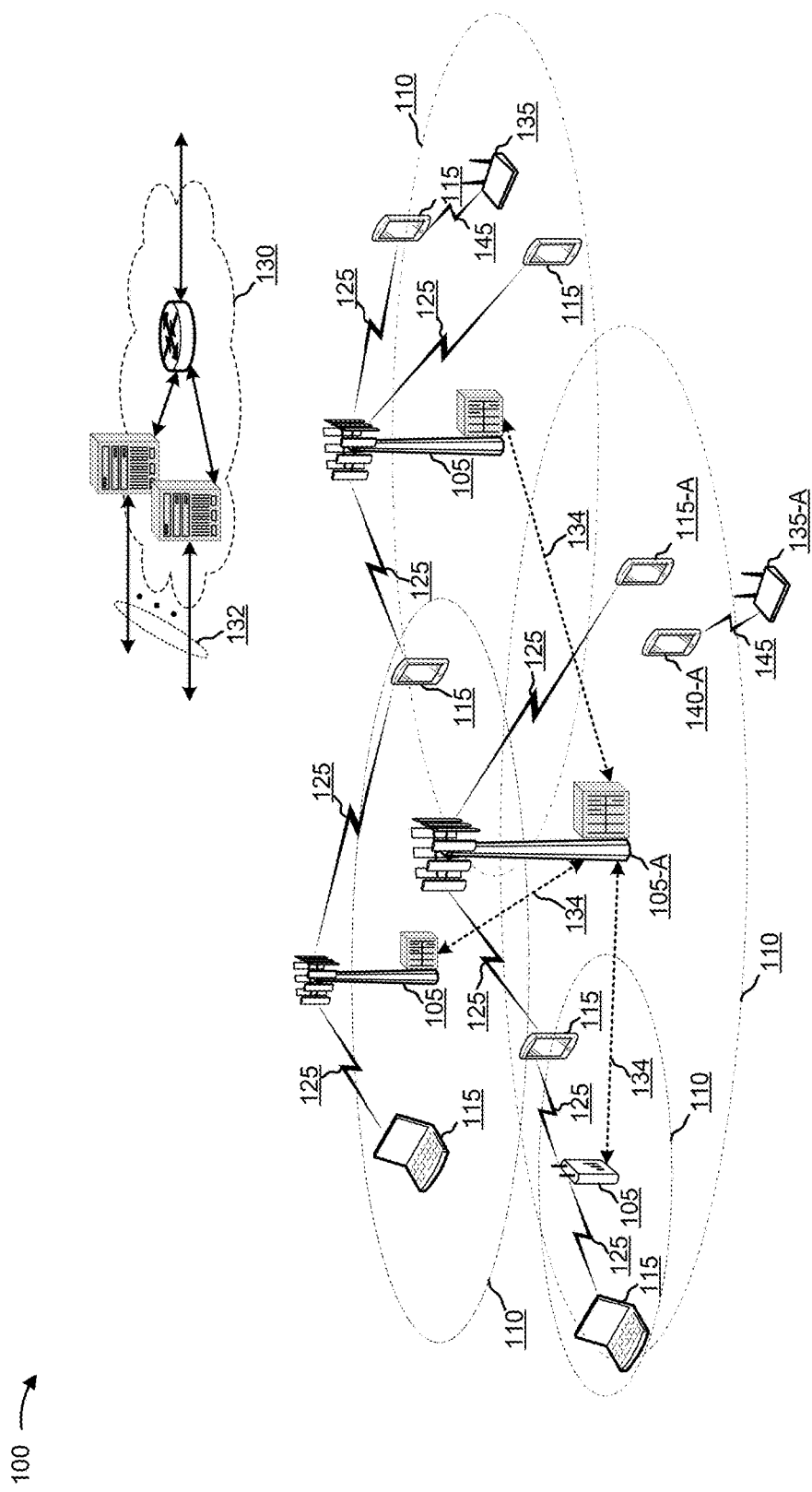
FIG. 1 is an illustration of an example wireless communication system, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for providing a thorough understanding of the various concepts. However, it will be apparent to those skilled in the art that these concepts may be practiced without these specific details.

Some communication devices, such as machine-type communication (MTC) devices, may benefit from reduced memory footprint and power consumption. Techniques described herein permit a UE, such as a phone, to act as a proxy for providing IMS services to multiple communication devices. In this way, a power consumption and a memory footprint of these communication device may be reduced by using the UE to handle IMS signaling for the communication devices. For example, the UE may include components for implementing a full IMS stack, whereas the communication devices may include fewer components for implementing a partial IMS stack, because the UE performs some IMS procedures and signaling for the communication devices. Techniques described herein also permit IMS services to be provided to multiple communication devices using a single IMS registration or a single IMS subscription of the UE, thereby reducing network complexity and memory requirements.

The techniques described herein may be used for one or more of various wireless communication networks, such as code division multiple access (CDMA) networks, time division multiple access (TDMA) networks, frequency division multiple access (FDMA) networks, orthogonal FDMA (OFDMA) networks, single carrier FDMA (SC-FDMA) networks, or other types of networks. A CDMA network may implement a radio access technology (RAT), such as universal terrestrial radio access (UTRA), CDMA2000, or the like. UTRA may include wideband CDMA (WCDMA) and/or other variants of CDMA. CDMA2000 may include Interim Standard (IS)-2000, IS-95 and IS-856 standards. IS-2000 may also be referred to as 1× radio transmission technology (1×RTT), CDMA2000 1×, or the like. A TDMA network may implement a RAT such as global system for mobile communications (GSM), enhanced data rates for GSM evolution (EDGE), or GSM/EDGE radio access network (GERAN). An OFDMA network may implement a RAT such as evolved UTRA (E-UTRA), ultra mobile broadband (UMB), Institute of Electrical and Electronics Engineers (IEEE) 802.11 (Wi-Fi), IEEE 802.16 (WiMAX), IEEE 802.20, Flash-OFDM, or the like. UTRA and E-UTRA may be part of the universal mobile telecommunication system (UMTS). 3GPP long-term evolution (LTE) and LTE-Advanced (LTE-A) are example releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and RATs mentioned above as well as other wireless networks and RATs.

FIG. 1 is an illustration of an example wireless communication system 100, in accordance with various aspects of the disclosure. The wireless communication system 100 may include a WWAN network, such as a cellular network, and a WLAN network, such as a Wi-Fi network. The cellular network may include one or more base stations 105, 105-A, one or more UEs 115, 115-A, and a core network 130. The Wi-Fi network may include one or more WLAN access points 135, 135-A (e.g., Wi-Fi access points) and one or more WLAN stations 140, 140-A (e.g., Wi-Fi stations).

With reference to the cellular network of the wireless communication system 100, the core network 130 may provide user authentication, access authorization, tracking, Internet Protocol (IP) connectivity, and other access, routing, or mobility functions. The base stations 105, 105-A may interface with the core network 130 through backhaul links 132 (e.g., S1, etc.) and may perform radio configuration and scheduling for communication with the UEs 115, 115-A, or may operate under the control of a base station controller (not shown). In various examples, the base stations 105, 105-A may communicate, either directly or indirectly (e.g., through core network 130), with each other over backhaul links 134 (e.g., X2, etc.), which may be wired or wireless communication links.

The base stations 105, 105-A may wirelessly communicate with the UEs 115, 115-A via one or more base station antennas. Each of the base station 105, 105-A sites may provide communication coverage for a respective geographic coverage area 110. In some examples, a base station 105, 105-A may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105, 105-A may be divided into sectors making up a portion of the coverage area (not shown). The cellular network may include base stations 105, 105-A of different types (e.g., macro and/or small cell base stations). There may be overlapping geographic coverage areas 110 for different technologies.

In some examples, the cellular network may include an LTE/LTE-A network. In LTE/LTE-A networks, the term evolved Node B (eNB) may be used to describe the base stations 105, 105-A, while the term UE may be used to describe the UEs 115, 115-A. The cellular network may be a Heterogeneous LTE/LTE-A network in which different types of eNBs provide coverage for various geographical regions. For example, each eNB or base station 105, 105-A may provide communication coverage for a macro cell, a small cell, and/or another type of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, unlicensed, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, or the like) cells (e.g., component carriers).

The cellular network may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The cellular network may in some examples include a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115, 115-A and the base stations 105, 105-A or core network 130 supporting radio bearers for the user plane data. At the Physical (PHY) layer, the transport channels may be mapped to Physical channels.

The UEs 115, 115-A may be dispersed throughout the wireless communication system 100, and each UE 115, 115-A may be stationary or mobile. A UE 115, 115-A may also include or be referred to by those skilled in the art as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115, 115-A may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations 105, 105-A and network equipment, including macro eNBs, small cell eNBs, relay base stations, or the like.

The communication links 125 shown in wireless communication system 100 may carry downlink (DL) transmissions from a base station 105, 105-A to a UE 115, 115-A, and/or uplink (UL) transmissions from a UE 115, 115-A to a base station 105, 105-A. The downlink transmissions may also be called forward link transmissions, while the uplink transmissions may also be called reverse link transmissions.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different subcarrier and may carry control information (e.g., reference signals, control channels, etc.), overhead information, user data, etc. The communication links 125 may transmit bidirectional communications using a frequency division duplexing (FDD) operation (e.g., using paired spectrum resources) or a time division duplexing (TDD) operation (e.g., using unpaired spectrum resources). Frame structures for FDD operation (e.g., frame structure type 1) and TDD operation (e.g., frame structure type 2) may be defined.

In some aspects of the wireless communication system 100, base stations 105, 105-A and/or UEs 115, 115-A may include multiple antennas for employing antenna diversity schemes to improve communication quality and reliability between base stations 105, 105-A and UEs 115, 115-A. Additionally or alternatively, base stations 105, 105-A and/or UEs 115, 115-A may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115, 115-A may be configured with multiple downlink CCs and one or more uplink CCs for carrier aggregation. Carrier aggregation may be used with both FDD and TDD component carriers.

With reference to the Wi-Fi network of the wireless communication system 100, the WLAN access points 135, 135-A may wirelessly communicate with the WLAN stations 140, 140-A via one or more WLAN access point antennas, over one or more communication links 145. In some examples, the WLAN access points 135, 135-A may communicate with the WLAN stations 140, 140-A using one or more Wi-Fi communication standards, such as an Institute of Electrical and Electronics (IEEE) Standard 802.11 (e.g., IEEE Standard 802.11a, IEEE Standard 802.11n, or IEEE Standard 802.11ac).

In some examples, a WLAN station 140, 140-A may be a cellular phone, a personal digital assistant (PDA), a wireless communication device, a handheld device, a tablet computer, a laptop computer, or the like. In some examples, an apparatus may include aspects of both a UE 115, 115-A and a WLAN station 140, 140-A, and such an apparatus may communicate with one or more base stations 105, 105-A using a first radio access technology (RAT) (e.g., a cellular RAT or multiple cellular RATs), and communicate with one or more WLAN access points 135, 135-A using a second RAT (e.g., a Wi-Fi RAT or multiple Wi-Fi RATs).

In some examples, the base stations 105, 105-A and UEs 115, 115-A may communicate over a licensed radio frequency spectrum band and/or an unlicensed radio frequency spectrum band, whereas the WLAN access points 135, 135-A and WLAN stations 140, 140-A may communicate over the unlicensed radio frequency spectrum band. The unlicensed radio frequency spectrum band may therefore be shared by the base stations 105, 105-A, the UEs 115, 115-A, the WLAN access points 135, 135-A, and/or the WLAN stations 140, 140-A.

The number and arrangement of components shown in FIG. 1 are provided as an example. In practice, wireless communication system 100 may include additional devices, fewer devices, different devices, or differently arranged devices than those shown in FIG. 1. Additionally, or alternatively, a set of devices (e.g., one or more devices) of wireless communication system 100 may perform one or more functions described as being performed by another set of devices of wireless communication system 100.

Figure 2:
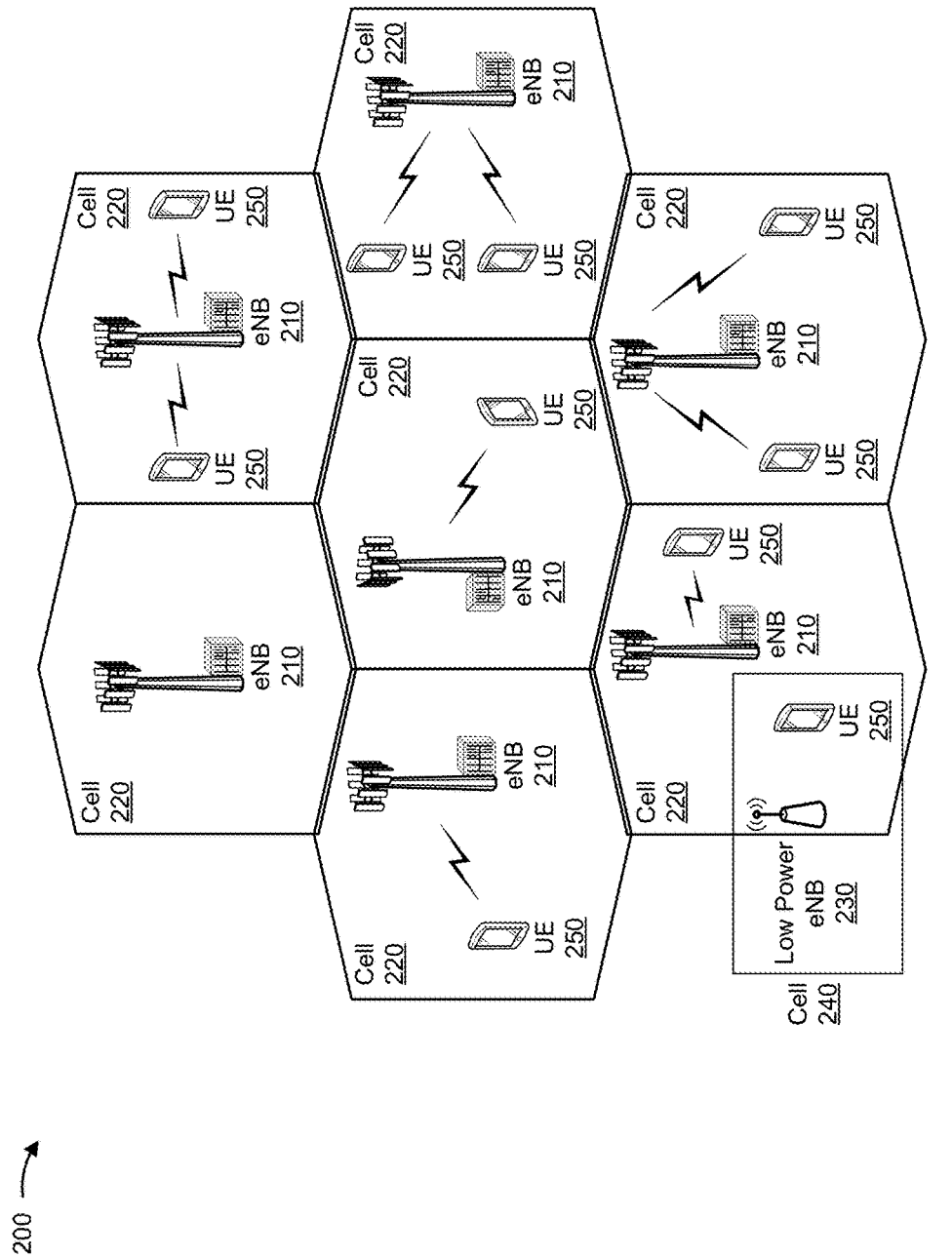
FIG. 2 is a diagram illustrating an example access network in an LTE network architecture, in accordance with various aspects of the present disclosure.

FIG. 2 is a diagram illustrating an example access network 200 in an LTE network architecture, in accordance with various aspects of the present disclosure. As shown, access network 200 may include a set of eNBs 210 that serve a corresponding set of cellular regions (cells) 220, a set of low power eNBs 230 that serve a corresponding set of cells 240, and a set of UEs 250.

Each eNB 210 may be assigned to a respective cell 220 and may be configured to provide an access point to a RAN. For example, eNB 210 may provide an access point for UE 250 to a RAN (e.g., eNB 210 may correspond to base station 105, shown in FIG. 1). UE 250 may correspond to UE 115, shown in FIG. 1. FIG. 2 does not illustrate a centralized controller for example access network 200, but access network 200 may use a centralized controller in some aspects. The eNBs 210 may perform radio related functions including radio bearer control, admission control, mobility control, scheduling, security, and network connectivity.

As shown in FIG. 2, one or more low power eNBs 230 may serve respective cells 240, which may overlap with one or more cells 220 served by eNBs 210. The low power eNBs 230 may correspond to base station 105, shown in FIG. 1. A low power eNB 230 may be referred to as a remote radio head (RRH). The low power eNB 230 may include a femto cell eNB (e.g., home eNB (HeNB)), a pico cell eNB, a micro cell eNB, or the like.

A modulation and multiple access scheme employed by access network 200 may vary depending on the particular telecommunications standard being deployed. In LTE applications, OFDM is used on the downlink (DL) and SC-FDMA is used on the uplink (UL) to support both frequency division duplexing (FDD) and time division duplexing (TDD). The various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. As another example, these concepts may also be extended to UTRA employing WCDMA and other variants of CDMA (e.g., such as TD-SCDMA, GSM employing TDMA, E-UTRA, or the like), UMB, IEEE 802.11 (Wi-Fi), IEEE 802.16 (WiMAX), IEEE 802.20, Flash-OFDM employing OFDMA, or the like. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The number and arrangement of devices and cells shown in FIG. 2 are provided as an example. In practice, there may be additional devices and/or cells, fewer devices and/or cells, different devices and/or cells, or differently arranged devices and/or cells than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
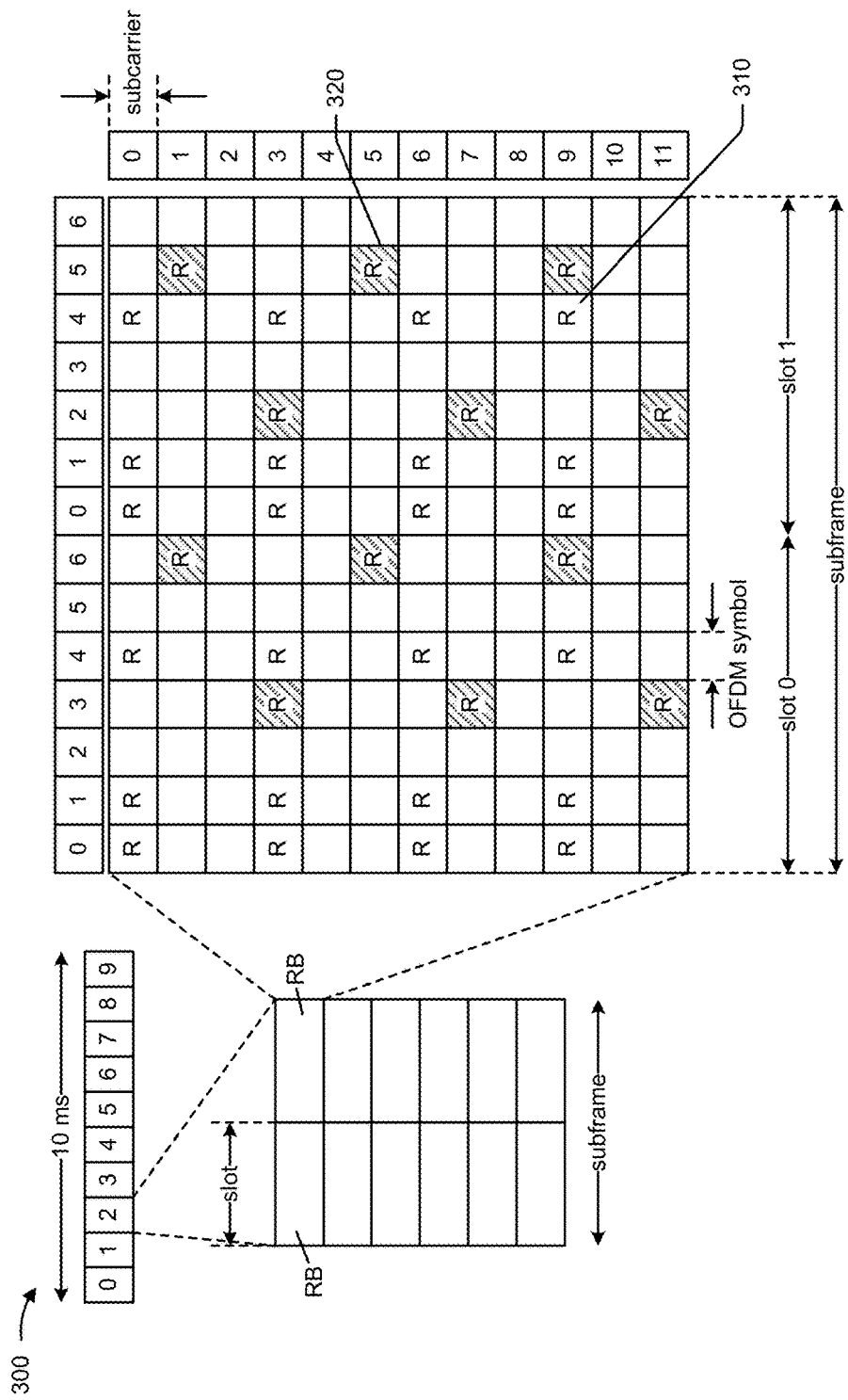
FIG. 3 is a diagram illustrating an example of a downlink (DL) frame structure in LTE, in accordance with various aspects of the present disclosure.

FIG. 3 is a diagram illustrating an example 300 of a downlink (DL) frame structure in LTE, in accordance with various aspects of the present disclosure. A frame (e.g., of 10 ms) may be divided into 10 equally sized sub-frames with indices of 0 through 9. Each sub-frame may include two consecutive time slots. A resource grid may be used to represent two time slots, each time slot including a resource block (RB). The resource grid is divided into multiple resource elements. In LTE, a resource block includes 12 consecutive subcarriers in the frequency domain and, for a normal cyclic prefix in each OFDM symbol, 7 consecutive OFDM symbols in the time domain, or 84 resource elements. For an extended cyclic prefix, a resource block includes 6 consecutive OFDM symbols in the time domain and has 72 resource elements. Some of the resource elements, as indicated as R 310 and R 320, include DL reference signals (DL-RS). The DL-RS include Cell-specific RS (CRS) (also sometimes called common RS) 310 and UE-specific RS (UE-RS) 320. UE-RS 320 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix (CP). The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe. The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs, and may also send the PDSCH in a unicast manner to specific UEs.

A number of resource elements may be available in each symbol period. Each resource element (RE) may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

As indicated above, FIG. 3 is provided as an example. Other examples are possible and may differ from what was described above in connection with FIG. 3.

Figure 4:
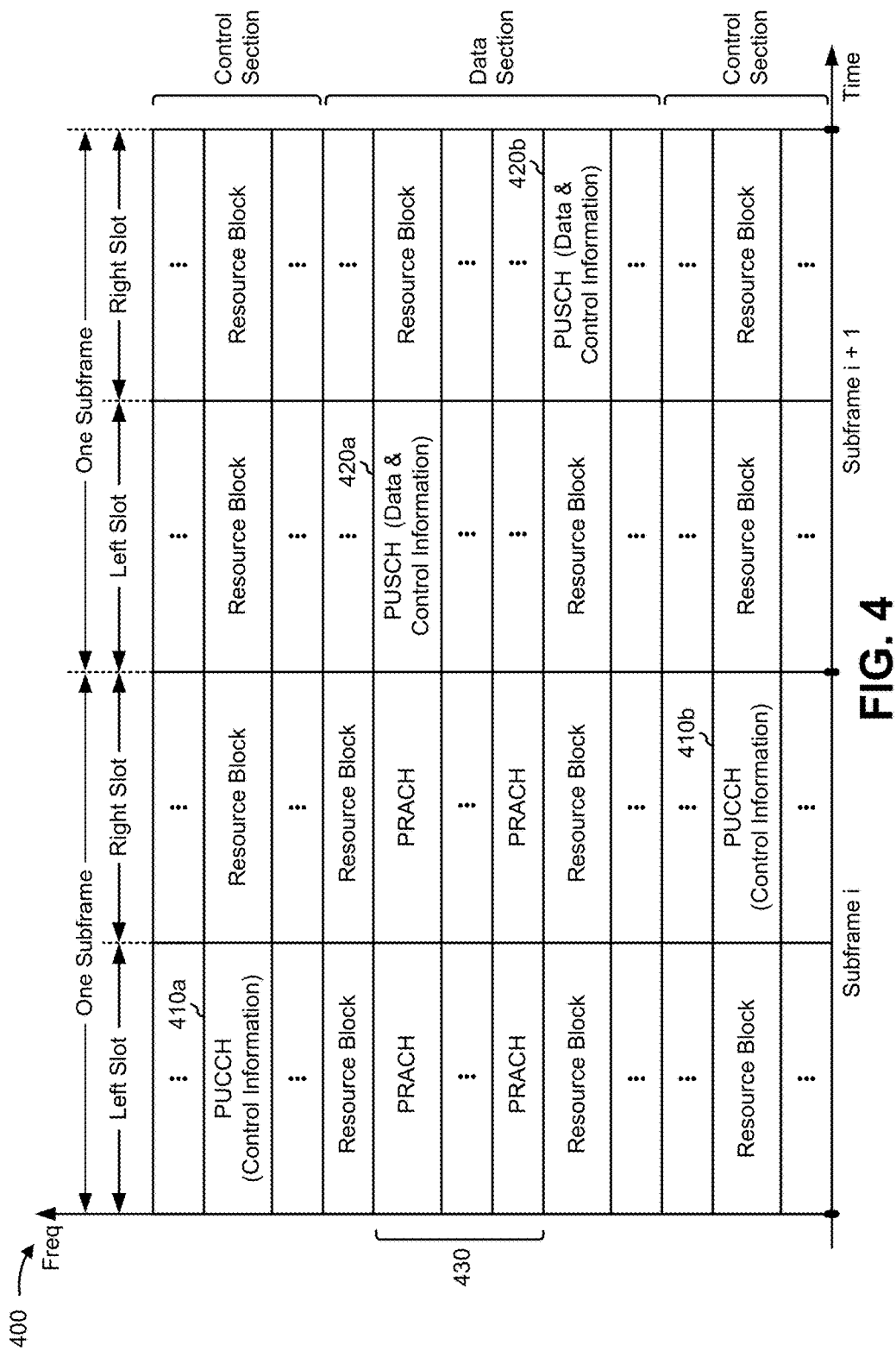
FIG. 4 is a diagram illustrating an example of an uplink (UL) frame structure in LTE, in accordance with various aspects of the present disclosure.

FIG. 4 is a diagram illustrating an example 400 of an uplink (UL) frame structure in LTE, in accordance with various aspects of the present disclosure. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. In some aspects, the UE may transmit only data or both data and control information in a physical UL shared channel (PUSCH) on the assigned resource blocks in the data section. A UL transmission may span both slots of a subframe and may hop across frequencies.

A set of resource blocks may be used to perform initial system access and achieve UL synchronization in a physical random access channel (PRACH) 430. The PRACH 430 carries a random sequence and cannot carry any UL data/ signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., of 1 ms) or in a sequence of few contiguous subframes.

As indicated above, FIG. 4 is provided as an example. Other examples are possible and may differ from what was described above in connection with FIG. 4.

Figure 5:
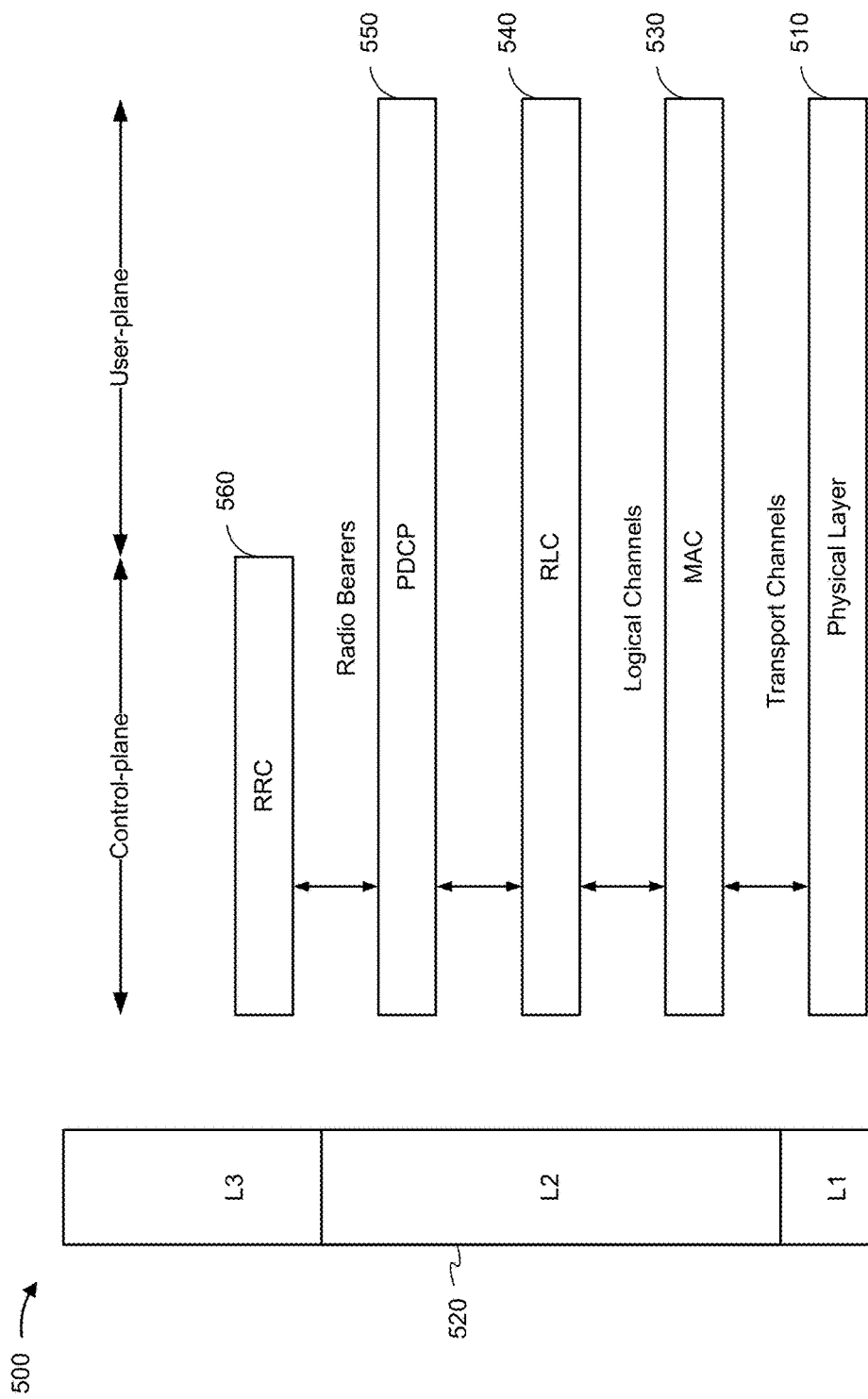
FIG. 5 is a diagram illustrating an example of a radio protocol architecture for a user plane and a control plane in LTE, in accordance with various aspects of the present disclosure.

FIG. 5 is a diagram illustrating an example 500 of a radio protocol architecture for a user plane and a control plane in LTE, in accordance with various aspects of the present disclosure. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 510. Layer 2 (L2 layer) 520 is above the physical layer 510 and is responsible for the link between the UE and eNB over the physical layer 510.

In the user plane, the L2 layer 520 includes a media access control (MAC) sublayer 530, a radio link control (RLC) sublayer 540, and a packet data convergence protocol (PDCP) 550 sublayer, which are terminated at the eNB on the network side. Although not shown, the UE may have several upper layers above the L2 layer 520 including a network layer (e.g., IP layer) that is terminated at a packet data network (PDN) gateway on the network side, and an application layer that is terminated at the other end of the connection (e.g., far end UE, server, etc.).

The PDCP sublayer 550 provides multiplexing between different radio bearers and logical channels. The PDCP sublayer 550 also provides header compression for upper layer data packets to reduce radio transmission overhead, security by ciphering the data packets, and handover support for UEs between eNBs. The RLC sublayer 540 provides segmentation and reassembly of upper layer data packets, retransmission of lost data packets, and reordering of data packets to compensate for out-of-order reception due to hybrid automatic repeat request (HARQ). The MAC sublayer 530 provides multiplexing between logical and transport channels. The MAC sublayer 530 is also responsible for allocating the various radio resources (e.g., resource blocks) in one cell among the UEs. The MAC sublayer 530 is also responsible for HARQ operations.

In the control plane, the radio protocol architecture for the UE and eNB is substantially the same for the physical layer 510 and the L2 layer 520 with the exception that there is no header compression function for the control plane. In some aspects, integrity protection may be provided for the control plane data. The control plane also includes a radio resource control (RRC) sublayer 560 in Layer 3 (L3 layer). The RRC sublayer 560 is responsible for obtaining radio resources (i.e., radio bearers) and for configuring the lower layers using RRC signaling between the eNB and the UE.

As indicated above, FIG. 5 is provided as an example. Other examples are possible and may differ from what was described above in connection with FIG. 5.

Figure 6:
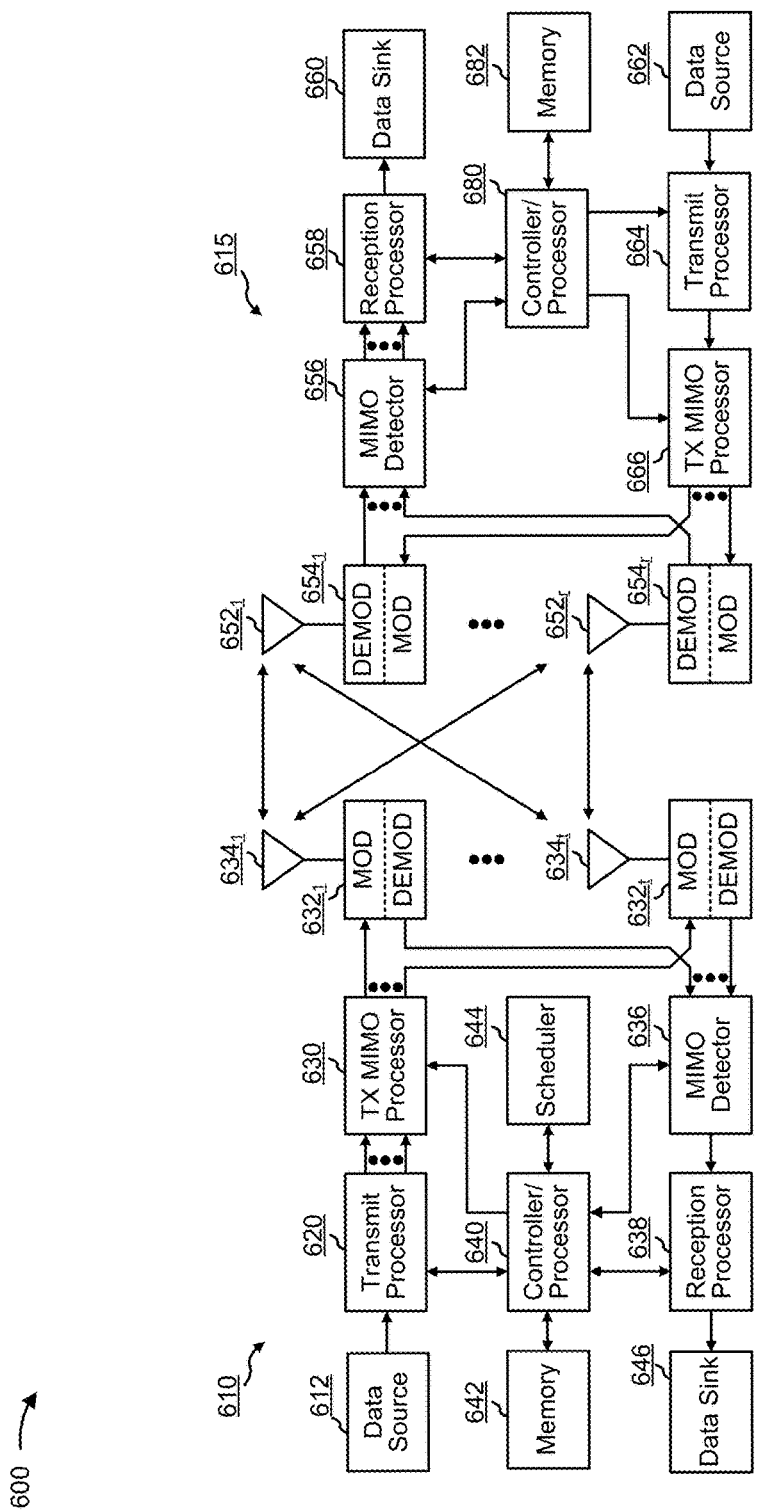
FIG. 6 is a diagram illustrating example components of a communication system including a base station and a UE, in accordance with various aspects of the present disclosure.

FIG. 6 is an illustration of example components of a communication system 600 including a base station 610 and a UE 615, in accordance with various aspects of the present disclosure. In some aspects, base station 610 may correspond to one or more of the base stations and/or eNBs 105, 105-A, 210, or 230 described with reference to FIG. 1 or 2. In some aspects, UE 615 may correspond to one or more of the UEs 115, 115-A, or 250 described above with reference to FIG. 1 or 2. Base station 610 may be equipped with antennas $634_{1-t}$, and UE 615 may be equipped with antennas $652_{1-r}$, wherein t and r are integers greater than or equal to one.

At base station 610, a base station transmit processor 620 may receive data from a base station data source 612 and control information from a base station controller/processor 640. The control information may be carried on the Physical Broadcast Channel (PBCH), the Physical Control Format Indicator Channel (PCFICH), the Physical Hybrid-ARQ Indicator Channel (PHICH), the Physical Downlink Control Channel (PDCCH), or the like. The data may be carried on the Physical Downlink Shared Channel (PDSCH), for example. Base station transmit processor 620 may process (e.g., encode and symbol map) the data and control information to obtain data symbols and control symbols, respectively. Base station transmit processor 620 may also generate reference symbols, e.g., for the PSS, SSS, and cell-specific reference signal (RS). A base station transmit (TX) multiple-input multiple-output (MIMO) processor 630 may perform spatial processing (e.g., precoding) on the data symbols, the control symbols, and/or the reference symbols, if applicable, and may provide output symbol streams to base station modulators/demodulators (MODs/DEMODs) $632_{1-t}$. Each base station modulator/demodulator 632 may process a respective output symbol stream (e.g., for orthogonal frequency-division multiplexing (OFDM), or the like) to obtain an output sample stream. Each base station modulator/demodulator 632 may further process (e.g., convert to analog, amplify, filter, and upconvert) the output sample stream to obtain a downlink signal. Downlink signals from modulators/demodulators $632_{1-t}$ may be transmitted via antennas $634_{1-t}$, respectively.

At UE 615, UE antennas $652_{1-r}$ may receive the downlink signals from base station 610 and may provide received signals to UE modulators/demodulators (MODs/DEMODs) $654_{1-r}$, respectively. Each UE modulator/demodulator 654 may condition (e.g., filter, amplify, downconvert, and digitize) a respective received signal to obtain input samples. Each UE modulator/demodulator 654 may further process the input samples (e.g., for OFDM, etc.) to obtain received symbols. A UE MIMO detector 656 may obtain received symbols from all UE modulators/demodulators $654_{1-r}$, and perform MIMO detection on the received symbols, if applicable, and provide detected symbols. A UE reception processor 658 may process (e.g., demodulate, deinterleave, and decode) the detected symbols, provide decoded data for UE 615 to a UE data sink 660, and provide decoded control information to a UE controller/processor 680.

On the uplink, at UE 615, a UE transmit processor 664 may receive and process data (e.g., for the Physical Uplink Shared Channel (PUSCH)) from a UE data source 662 and control information (e.g., for the Physical Uplink Control Channel (PUCCH)) from UE controller/processor 680. UE transmit processor 664 may also generate reference symbols for a reference signal. The symbols from UE transmit processor 664 may be precoded by a UE TX MIMO processor 666, if applicable, may be further processed by UE modulator/demodulators $654_{1-r}$ (e.g., for SC-FDM, etc.), and may be transmitted to base station 610. At base station 610, the uplink signals from UE 615 may be received by base station antennas 634, processed by base station modulators/demodulators 632, detected by a base station MIMO detector 636, if applicable, and further processed by a base station reception processor 638 to obtain decoded data and control information sent by UE 615. Base station reception processor 638 may provide the decoded data to a base station data sink 646 and the decoded control information to base station controller/processor 640.

Base station controller/processor 640 and UE controller/processor 680 may direct operation of base station 610 and UE 615, respectively. Base station controller/processor 640 and/or other processors and modules at base station 610 may perform or direct, for example, execution of various processes for the techniques described herein. UE controller/processor 680 and/or other processors and modules at UE 615 may also perform or direct, for example, execution of one or more blocks illustrated in FIG. 9, FIG. 10, FIG. 11, and/or other processes for the techniques described herein. A base station memory 642 and a UE memory 682 may store data and program code for base station 610 and UE 615, respectively. A scheduler 644 may schedule UEs 615 for data transmission on the downlink and/or uplink.

In one configuration, UE 615 may include means for providing IMS services to multiple communication devices (e.g., machine-type communication devices) using UE 615 as a proxy, as described herein. In one aspect, the aforementioned means may be UE controller/processor 680, UE memory 682, UE reception processor 658, UE MIMO detector 656, UE modulators/demodulators 654, and/or UE antennas 652 configured to perform the functions recited by the aforementioned means. In another aspect, the aforementioned means may be a module, at least partially implemented in hardware, or any apparatus configured to perform the functions recited by the aforementioned means.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single components shown in FIG. 6 may be implemented as multiple, distributed components. Additionally, or alternatively, a set of components (e.g., one or more components) shown in FIG. 6 may perform one or more functions described as being performed by another set of components shown in FIG. 6.

Figure 7:
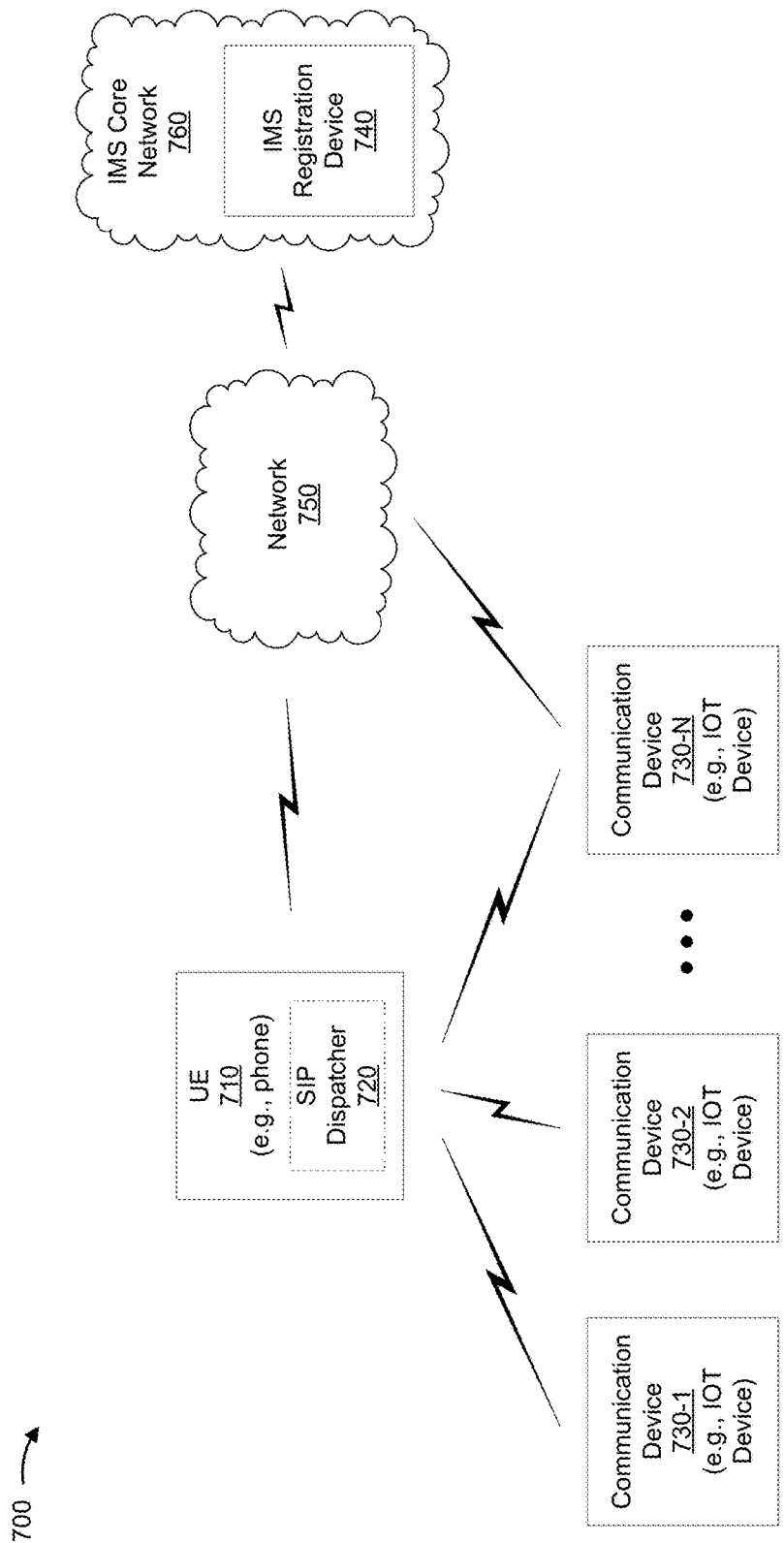
FIG. 7 is an illustration of an example wireless communication system, in accordance with various aspects of the present disclosure.

FIG. 7 is an illustration of an example wireless communication system 700, in accordance with various aspects of the present disclosure. As shown, wireless communication system 700 may include a UE 710, which may include a session initiation protocol (SIP) dispatcher 720. As further shown, wireless communication system 700 may include a plurality of communication devices 730 (e.g., communication devices 730-1, 730-2, ..., 730-N, where N≥1), an IMS registration device 740, a network 750, and an IMS core network 760.

UE 710 may include a wireless communication device. For example, UE 710 may include UE 115, UE 115-A, UE 250, UE 615, and/or another UE described herein. In some aspects, UE 710 may include a wireless phone, a tablet computer, or another type of device capable of registering multiple communication devices 730, for an IMS service, via a single IMS registration with IMS registration device 740.

SIP dispatcher 720 may include one or more components of UE 710 configured to process SIP messages originating from or destined for communication device(s) 730. For example, SIP dispatcher 720 may include a processor, a memory, and/or one or more components of UE 615, as described above in connection with FIG. 6.

Communication device 730 may include a communication device, such as a wireless communication device. For example, communication device 730 may include a machine-type communication (MTC) device, which may also be referred to as a machine-to-machine (M2M) communication device, an Internet of Things (IoT) device, or Internet of Everything (IoE) device, an enhanced machine-type communication (eMTC) device, or the like. An MTC device may provide for automated communication, and may communicate with other devices or a base station without human intervention. For example, an MTC device may include a sensor to measure or capture information and relay that information to a central server or application that can make use of the information or present the information to humans interacting with the central server or application. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In some aspects, an MTC device may operate using half-duplex (one-way) communications at a reduced peak rate. In some aspects, an MTC device may be configured to enter a power saving "deep sleep" mode when not engaging in active communications.

Techniques described herein permit UE 710 to act as a proxy for providing IMS services to multiple communication devices 730. In this way, a power consumption and a memory footprint of communication device 730 may be reduced by using UE 710 to handle IMS signaling, with IMS registration device 740, for communication device 730. For example, UE 710 may include components for implementing a full IMS stack, whereas communication device 730 may include fewer components for implementing a partial IMS stack, because UE 710 performs some IMS procedures and signaling for communication device 730. Techniques described herein also permit IMS services to be provided to multiple communication devices 730 using a single IMS registration or IMS subscription of UE 710, thereby reducing network complexity and memory requirements.

IMS registration device 740 may include one or more devices capable of registering other devices or addresses for IMS services. For example, IMS registration device 740 may include an authentication, authorization, and accounting (AAA) server, a home subscriber server (HSS), a SIP registrar server, or the like. In some aspects, IMS registration device 740 may be implemented within IMS core network 760. As described elsewhere herein, UE 710 may register multiple communication devices 730, with IMS registration device 740, using a single IMS registration of UE 710. For example, multiple communication devices 730 may register with UE 710, and UE 710 may register with IMS registration device 740. In this way, multiple communication devices 730 may send SIP messages via UE 710 without requiring separate registration of each of the communication devices 730 with the IMS registration device 740.

Network 750 includes one or more wired and/or wireless networks. For example, network 750 may include a cellular network (e.g., a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

IMS core network 760 includes one or more wired and/or wireless networks, such as one or more of the networks described above in connection with network 750. In some aspects, IMS core network 760 may include a core network (e.g., of a telecommunication service provider) that assists with providing IMS services. In some aspects, IMS registration device 740 is included in IMS core network 760.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of wireless communication system 700 may perform one or more functions described as being performed by another set of devices of wireless communication system 700.

FIGS. 8A-8F are diagrams illustrating examples 800 of providing IMS services to multiple machine-type communication devices using a user equipment as a proxy, in accordance with various aspects of the present disclosure.

Figure 8A:
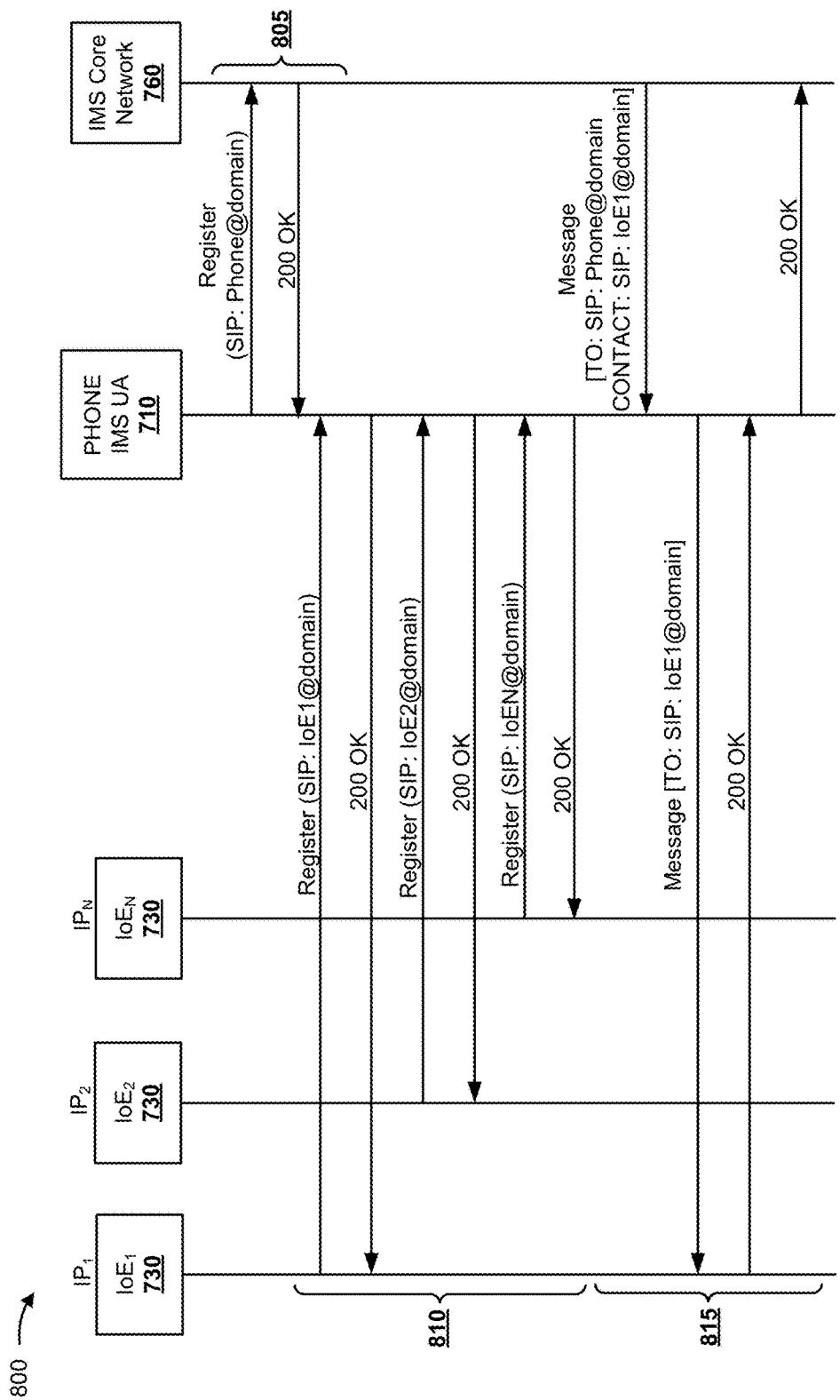
FIGS. 8A-8F are diagrams illustrating examples of providing IMS services to multiple machine-type communication devices using a user equipment as a proxy, in accordance with various aspects of the present disclosure.

As shown in FIG. 8A, and by reference number 805, UE 710 (e.g., a phone serving as an IMS user agent (UA)) may register with IMS registration device 740 located in IMS core network 760. For example, UE 710 may register using one or more credentials, such as a credential associated with a subscriber identity module (SIM) of UE 710. As shown by reference number 810, multiple communication devices 730 (e.g., shown as $IoE_1$, $IoE_2$, and $IoE_N$) may register with UE 710. For example, communication devices 730 may register with UE 710 by sending corresponding SIP REGISTER messages to UE 710. A SIP REGISTER message may include a SIP address of communication device 730 (e.g., shown as IoE1@domain, IoE2@domain, and IoEN@domain). UE 710 may register communication devices 730 locally on UE 710 by storing the SIP addresses. In some aspects, different communication devices 730 may be associated with different IP addresses corresponding to the SIP addresses (e.g., shown as $IP_1$, $IP_2$, and $IP_N$).

In some aspects, UE 710 may store the SIP addresses in association with corresponding feature tags associated with an IMS service requested by communication devices 730. For example, a feature tag may indicate a service requested by communication device 730, and UE 710 may store the feature tag in association with a SIP address of communication device 730. In some aspects, UE 710 may determine whether UE 710 is registered (e.g., with IMS registration device 740) for the service requested by communication device 730. In some aspects, if UE 710 is not registered with IMS registration device 740 for the service, then UE 710 may register for the service. For example, UE 710 may send a SIP REGISTER message, that includes the feature tag, to IMS registration device 740. In some aspects, if UE 710 is not registered with IMS registration device 740 for the service, then UE 710 may deny SIP registration of communication device 730.

In this way, multiple communication devices 730 may register for an IMS service via a single IMS registration associated with UE 710 (e.g., by mapping multiple SIP addresses to a single UE subscription to the IMS service). This enables computing resources of communication device 730 to be conserved. For example, memory resources of communication device 730 may be conserved because IMS functionality may be performed by UE 710 rather than communication device 730, so that communication device 730 can have a reduced IMS stack. Furthermore, processing resources of communication device 730 may be conserved because UE 710 performs IMS signaling and other processing that would otherwise be performed by each communication device 730.

As further shown in FIG. 8A, and by reference number 815, UE 710 may process incoming messages destined for communication devices 730. For example, UE 710 may receive a SIP message (e.g., transmitted via IMS core network 760) destined for communication device 730. The SIP message may include a UE identifier, that identifies UE 710, in a first message field, such as a TO field that includes a SIP address of UE 710 (e.g., shown as Phone@domain). Additionally, or alternatively, the SIP message may identify communication device 730 in a second message field, such as a CONTACT field that includes a SIP address of communication device 730 (e.g., shown as IoE1@domain).

UE 710 may use the SIP address in the second message field to identify communication device 730 as a destination for the SIP message, and may transmit the SIP message to communication device 730. For example, UE 710 may remove the SIP address of UE 710 from the TO field, and may insert the SIP address of communication device 730 in the TO field. Additionally, or alternatively, UE 710 may remove the SIP address of communication device 730 from the CONTACT field.

In FIG. 8A, UE 710 is shown as acting as an intermediary for messages sent to communication device 730. However, in some aspects, registration of communication device 730 with UE 710 may permit communication device 730 to communicate with other devices via peer-to-peer communication (e.g., without using UE 710 as an intermediary). For example, registration of communication devices 730 may permit communication devices 730 to discover one another on network 250, and to communicate directly after such discovery.

Figure 8B:
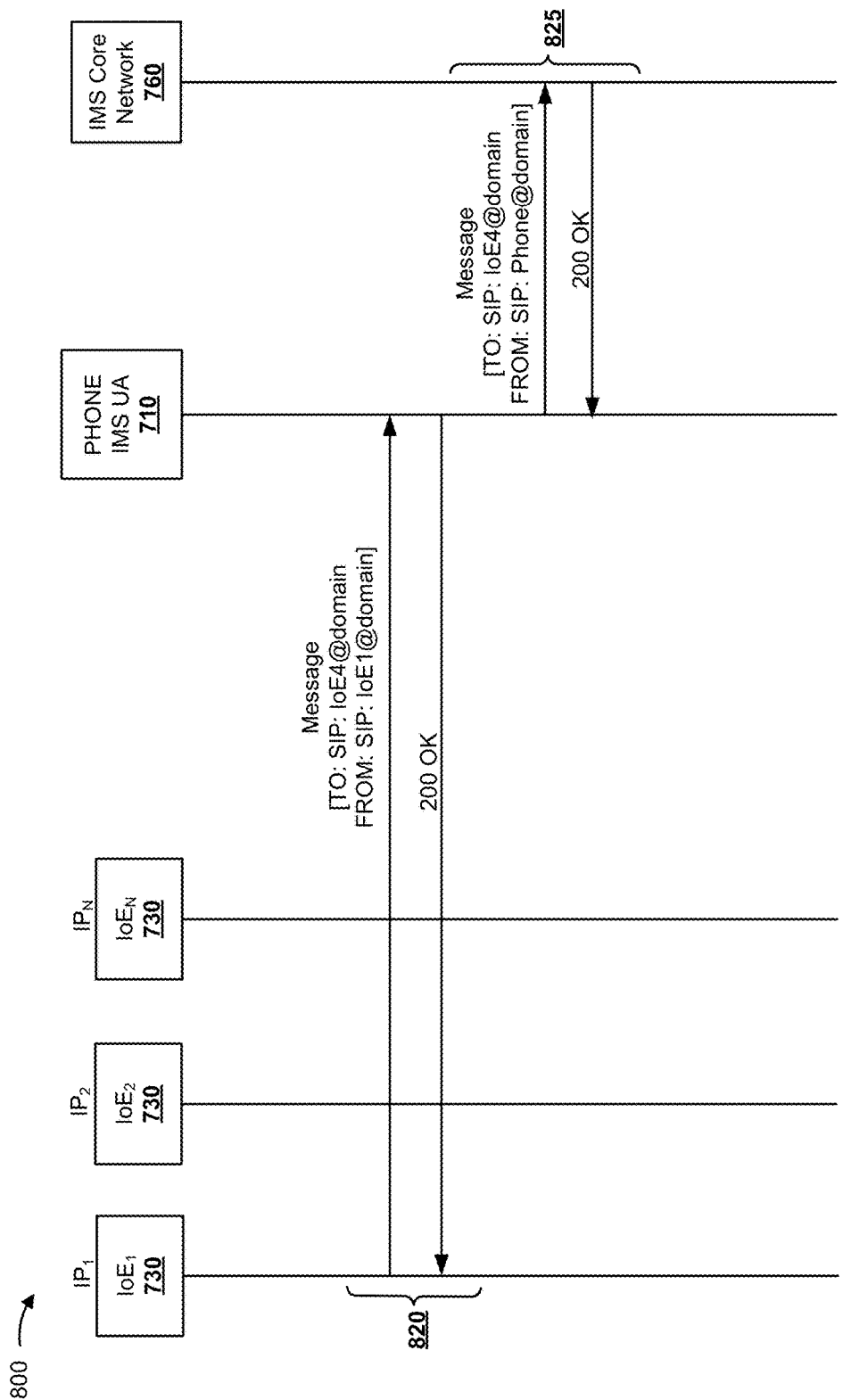

FIG. 8B shows an example of transmitting a message, that originates from communication device 730, after communication device 730 has registered with UE 710 and after UE 710 has registered with IMS registration device 740. As shown by reference number 820, communication device 730 (e.g., $IoE_1$) may transmit a message that identifies a destination device for the message (e.g., $IoE_4$). For example, the message may include a SIP address of $IoE_4$ in a TO field (e.g., IoE4@domain), and may include a SIP address of $IoE_1$ in a FROM field (e.g., IoE1@domain).

As shown by reference number 825, UE 710 may receive the message, and may generate a SIP message that identifies UE 710 in the FROM field (e.g., Phone@domain), and that identifies the destination device in the TO field (e.g., IoE4@domain). UE 710 may transmit the generated SIP message to the destination device via IMS core network 760. In some aspects, UE 710 may transmit messages in this way when the destination device (e.g., $IoE_4$) is registered with IMS registration device 740 (e.g., is not registered with any UE 710).

Figure 8C:
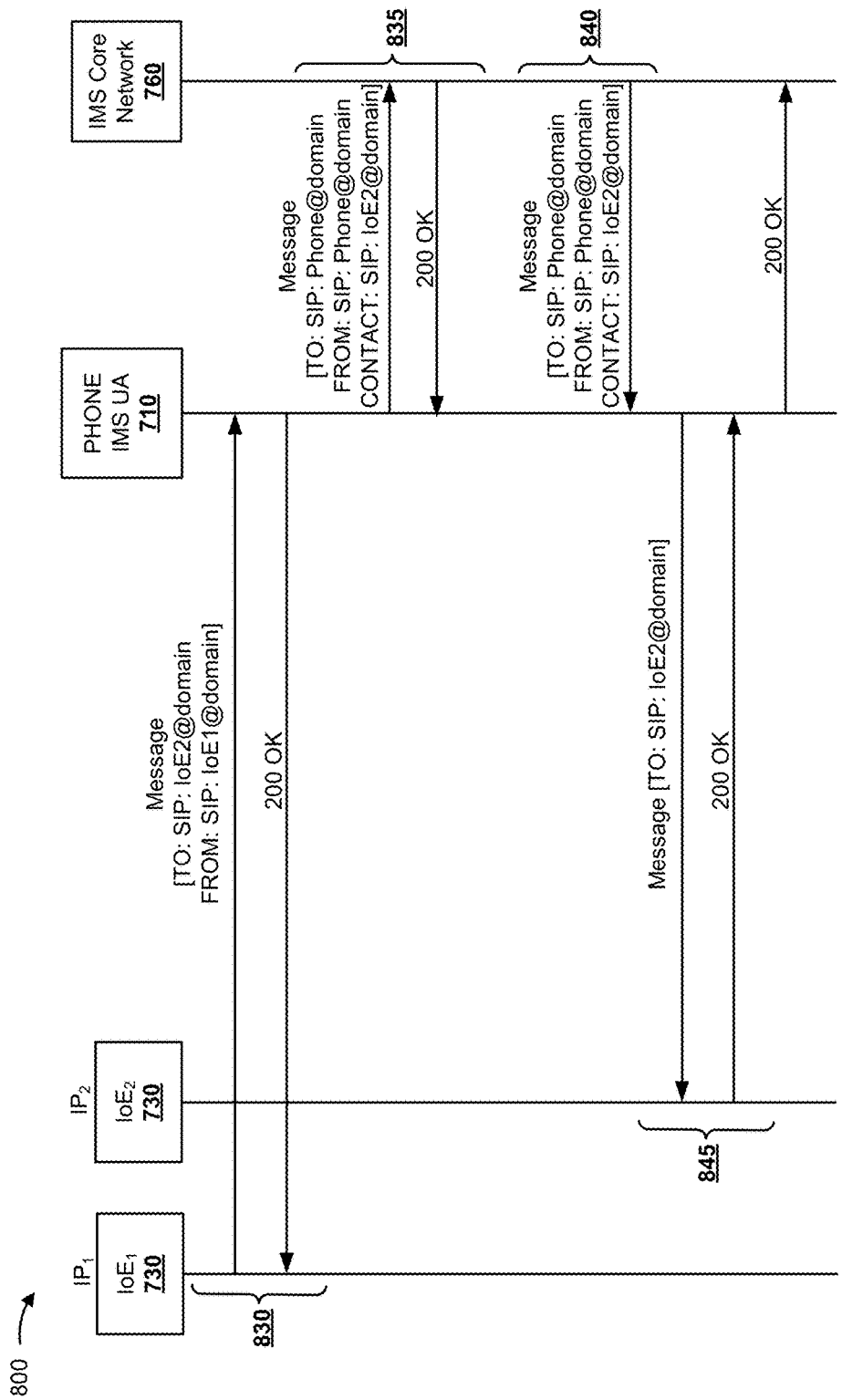

As shown in FIG. 8C, in some aspects, the source device and the destination device may both be registered with the same UE 710. For example, the source device may be $IoE_1$, the destination device may be $IoE_2$, and both $IoE_1$ and $IoE_2$ are registered with UE 710. In this case, UE 710 may send the message directly to the destination device without sending the message to IMS core network 760, in some aspects. Alternatively, UE 710 may send the message via IMS core network 760.

For example, as shown by reference number 830, the message from $IoE_1$ may include a SIP address of $IoE_2$ in the TO field (e.g., IoE2@domain), and a SIP address of $IoE_1$ in the FROM field (e.g., IoE1@domain). UE 710 may determine that the SIP address of $IoE_2$ has been registered with UE 710 (e.g., based at least in part on information stored by UE 710 during registration of communication devices 730). Based at least in part on this determination, UE 710 may generate a SIP message that includes a SIP address of UE 710 (e.g., Phone@domain) in the TO field and the FROM field (e.g., because both the source device and the destination device are registered with UE 710), as shown by reference number 835. Further, UE 710 may generate the SIP message to include the SIP address of $IoE_2$ in the CONTACT field (e.g., IoE2@domain). UE 710 may transmit the SIP message via IMS core network 760 so that any necessary SIP message processing can be performed by one or more devices located in IMS core network 760.

As shown by reference number 840, UE 710 may receive the SIP message from IMS core network 760 after the SIP message has been processed by one or more devices of IMS core network 760. UE 710 may receive the SIP message back from IMS core network 760 because UE 710 was identified in both the TO field and the FROM field of the SIP message. UE 710 may identify the SIP address of $IoE_2$ in the CONTACT field (e.g., IoE2@domain), and may send the SIP message to $IoE_2$, as shown by reference number 845. While FIG. 8C shows UE 710 transmitting the SIP message via IMS core network 760, in some aspects, UE 710 may transmit the SIP message directly to the destination device (e.g., via network 750) without first transmitting the SIP message via IMS core network 760. This can save network resources by eliminating the transmissions to and from IMS core network 760.

Figure 8D:
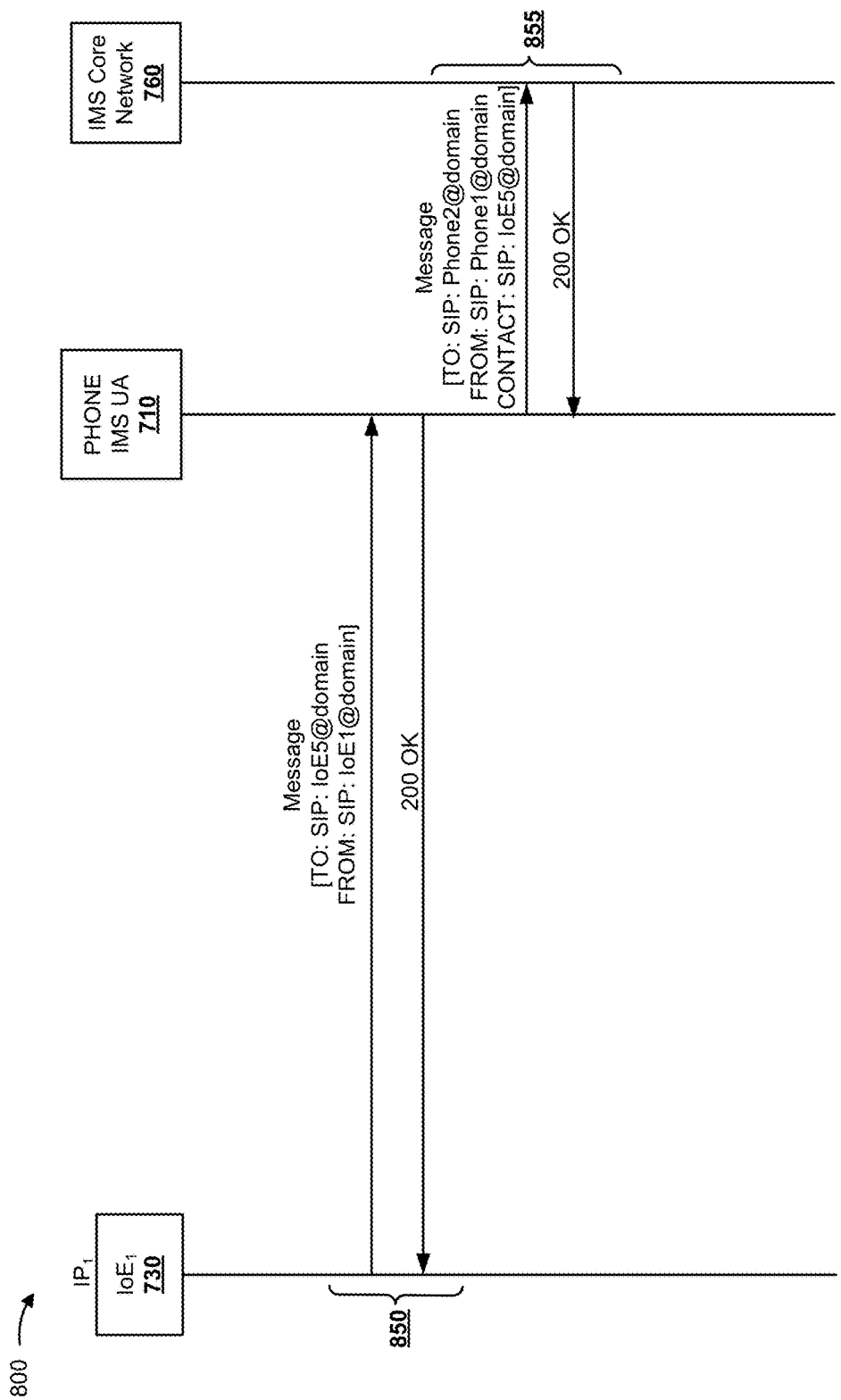

As shown in FIG. 8D, in some aspects, the source device and the destination device may be registered with different UEs 710. For example, $IoE_1$ may be registered with a first UE 710, and $IoE_5$ may be registered with a second UE 710. In this case, each UE 710 may advertise a list of communication devices 730 registered with UE 710. For example, the second UE 710 may advertise to the first UE 710 that $IoE_5$ is registered with the second UE 710 (e.g., by sending information that indicates an association between a SIP address of the second UE 710 and SIP address of $IoE_5$). The first UE 710 may use this information to transmit a message from $IoE_1$ to $IoE_5$.

For example, as shown by reference number 850, $IoE_1$ may transmit a message destined for $IoE_5$. In this case, $IoE_1$ may transmit the message to the first UE 710. The message may include a SIP address of $IoE_5$ in the TO field (e.g., IoE5@domain), and a SIP address of $IoE_1$ in the FROM field (e.g., IoE1@domain). As shown by reference number 855, using the advertised list, the first UE 710 may generate a SIP message that includes a SIP address of the second UE 710 in the TO field (e.g., Phone2@domain), and a SIP address of the first UE 710 in the FROM field (e.g., Phone1@domain). Further, the first UE 710 may generate the message to include a SIP address of $IoE_5$ (e.g., IoE5@domain) in a CONTACT field. In this way, the SIP message may be sent via IMS core network 760 to the second UE 710, which may then transmit the SIP message to $IoE_5$, which is registered with the second UE 710.

Figure 8E:
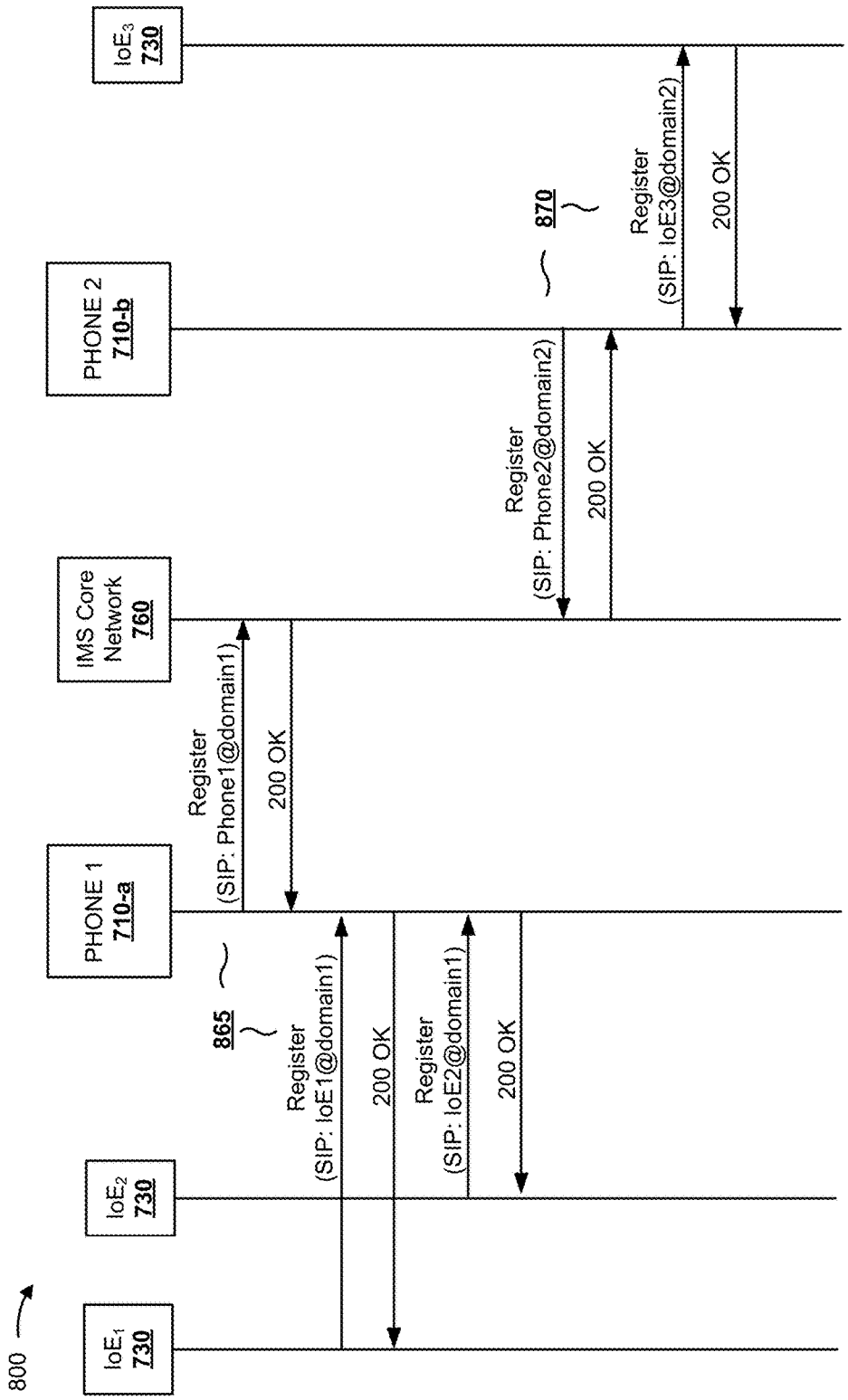

As shown in FIG. 8E, in some aspects, different IoE devices may register with different UEs 710, and the UEs 710 may register with IMS core network 760 using a unique domain (e.g., each UE 710 registered with IMS core network 760 may use a different domain). For example, as shown by reference number 865, a first UE 710-a may register with IMS core network 760 using a domain shown as "domain1" (e.g., Phone1@domain1). In some aspects, the IoE devices registered with first UE 710-a may be associated with the same domain as the first UE 710-a (e.g., domain1). For example, $IoE_1$ may register with the first UE 710-a using an address shown as IoE1@domain1, and $IoE_2$ may register with the first UE 710-a using an address shown as IoE2@domain1. In this way, the same unique domain may be used for a UE 710 and all wireless communication devices 730 registered with that UE 710.

As shown by reference number 870, a second UE 710-b may register with IMS core network 760 using a domain shown as "domain2" (e.g., Phone2@domain2), which is different from the domain used by the first UE 710-a. In some aspects, the IoE devices registered with second UE 710-b may be associated with the same domain as the second UE 710-b (e.g., domain2). For example, $IoE_3$ may register with the second UE 710-b using an address shown as IoE3@domain2. These unique domains may be used when transmitting a message from a wireless communication device 730 registered with the first UE 710-a (e.g., $IoE_1$ or $IoE_2$) to a wireless communication device 730 registered with the second UE 710-b (e.g., $IoE_3$), and vice versa, as described in more detail below with regard to FIG. 8F.

Figure 8F:
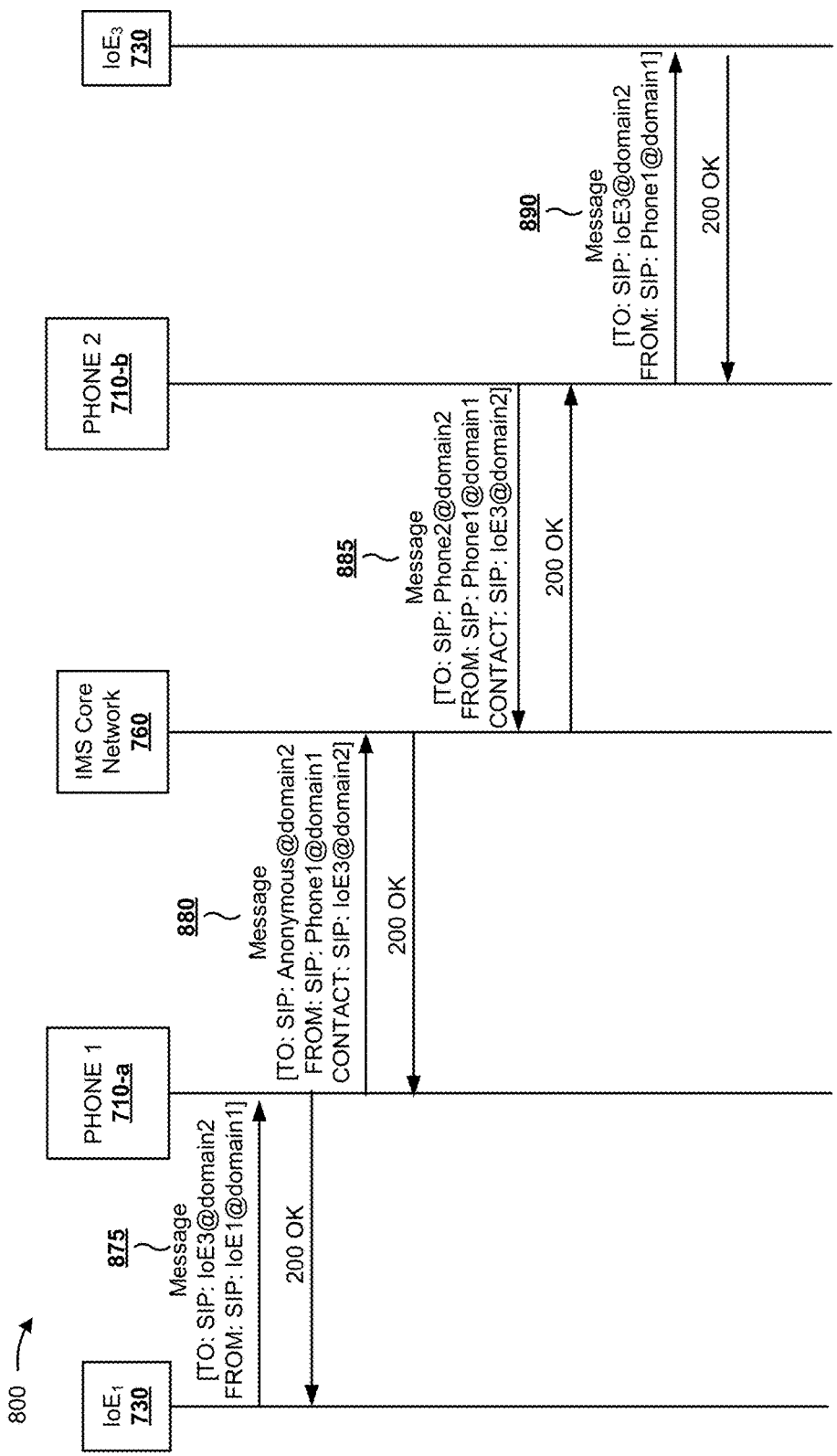

As shown in FIG. 8F, and by reference number 875, $IoE_1$ may transmit a message destined for $IoE_3$. In this case, $IoE_1$ may transmit the message to the first UE 710-a. The message may include a SIP address and a destination domain of $IoE_3$ in the TO field (e.g., IoE3@domain2), and a SIP address and a source domain of $IoE_1$ in the FROM field (e.g., IoE1@domain1). As shown by reference number 880, the first UE 710-a may generate a SIP message that includes a SIP address for an anonymous device associated with the destination domain of $IoE_3$ in the TO field (e.g., Anonymous@domain2), a SIP address and source domain of the first UE 710-b in the FROM field (e.g., Phone1@domain1), and a SIP address and destination domain of $IoE_3$ (e.g., IoE3@domain2) in a CONTACT field.

As shown by reference number 885, the IMS core network 760 may use the destination domain in the TO field to determine a SIP address of the second UE 710-b (e.g., based on SIP registration of the second UE 710-b, described above in connection with FIG. 8E). For example, the IMS core network 760 may identify a SIP address of the second UE 710-b as Phone2@domain2, and may insert this SIP address in a TO field of a message transmitted to the second UE 710-b. As shown by reference number 890, the second UE 710-b may transmit the message to $IoE_3$. For example, the second UE 710-b may use the SIP address in the CONTACT field to determine that the message is to be sent to IoE3@domain2, and may insert this address into the TO field.

While not shown, in some implementations, the SIP message generated by the first UE 710-a and transmitted to $IoE_3$ may include another field (e.g., a fourth field or a second CONTACT field) that identifies a SIP address and source domain of $IoE_1$ (e.g., IoE1@domain1). In this way, IoE3 may identify a source of the message, and may transmit a message back to the source if appropriate. Furthermore, while FIGS. 8A-8F are shown with respect to SIP messages, other types of IMS messages may be transmitted in a similar manner (e.g., an INVITE message or another type of message).

In this way, UE 710 may manage SIP messaging and/or other IMS services for multiple communication devices 730. The multiple communication devices 730 may be registered with UE 710, which may be registered with IMS registration device 740 via a single IMS registration. This conserves memory resources and processing resources of communication devices 730, as discussed elsewhere herein. Furthermore, such a configuration may conserve computing resources of IMS registration device 740 because IMS registration device 740 manages only a single registration of UE 710, rather than multiple registrations of communication devices 730. Additionally, network resources may be conserved by reducing a number of network connections that need to be established between IMS core network 760 and communication devices 730. For example, only a single network connection needs to be established between IMS core network 760 and UE 710, rather than multiple network connections being established between IMS core network 760 and multiple communication devices 730.

As indicated above, FIGS. 8A-8F are provided as examples. Other examples are possible and may differ from what was described in connection with FIGS. 8A-8F.

Figure 9:
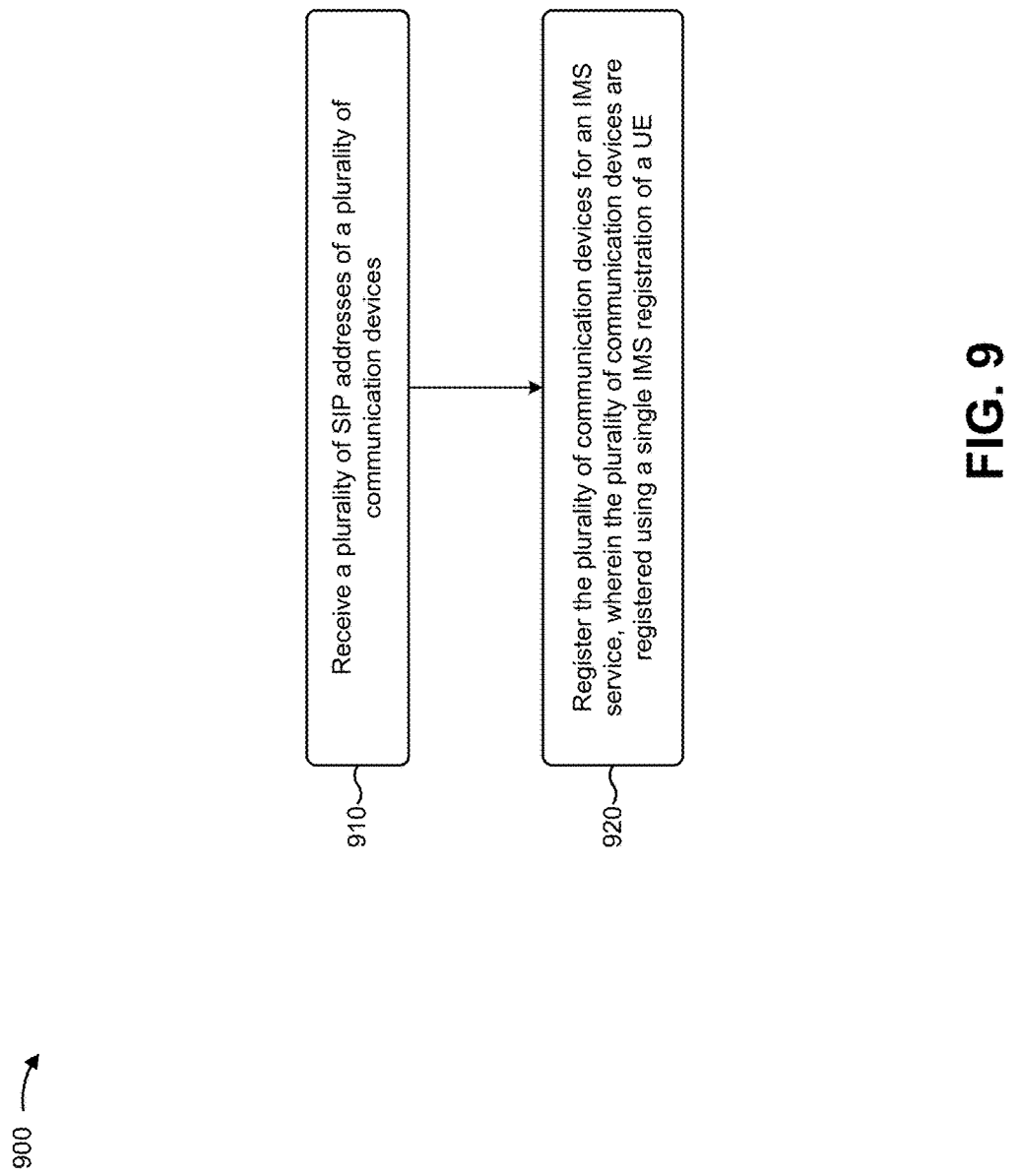
FIG. 9 is a flow diagram of an example process for providing IMS services to multiple machine-type communication devices using a user equipment as a proxy, in accordance with various aspects of the present disclosure.

FIG. 9 is a flow diagram of an example process 900 for providing IMS services to multiple machine-type communication devices using a user equipment as a proxy, in accordance with various aspects of the present disclosure. In some aspects, one or more process blocks of FIG. 9 may be performed by one or more UEs described herein. In some aspects, one or more process blocks of FIG. 9 may be performed by another device or a plurality of devices separate from or including a UE.

As shown in FIG. 9, in some aspects, process 900 may include receiving a plurality of SIP addresses of a plurality of communication devices (block 910). For example, UE 710 may receive a plurality of SIP addresses of a plurality of communication devices 730. In some aspects, UE 710 may receive the SIP addresses from the communication devices 730 (e.g., via network 750). In some aspects, the plurality of communication devices 730 may be machine-type communication devices.

As shown in FIG. 9, in some aspects, process 900 may include registering the plurality of communication devices for an IMS service, wherein the plurality of communication devices are registered using a single IMS registration of a UE (block 920). For example, UE 710 may register the plurality of communication devices 730 for an IMS service. In some aspects, the plurality of communication devices 730 may be registered using a single IMS registration of UE 710. In some aspects, the plurality of SIP addresses are mapped to a single UE subscription, to the IMS service, associated with UE 710.

In some aspects, when registering the plurality of communication devices 730, UE 710 may register the plurality of communication devices 730 using SIP registration. In some aspects, when registering the plurality of communication devices 730, UE 710 may store the plurality of SIP addresses and corresponding feature tags associated with the IMS service. The corresponding feature tags may identify one or more services requested by the plurality of communication devices 730. In some aspects, registering the plurality of communication devices 730 permits the plurality of communication devices 730 to communicate via peer-to-peer communication without using UE 710 as an intermediary.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a flow diagram of another example process 1000 for providing IMS services to multiple machine-type communication devices using a user equipment as a proxy, in accordance with various aspects of the present disclosure. In some aspects, one or more process blocks of FIG. 10 may be performed by one or more UEs described herein. In some aspects, one or more process blocks of FIG. 10 may be performed by another device or a plurality of devices separate from or including a UE.

As shown in FIG. 10, in some aspects, process 1000 may include receiving a SIP message, destined for a communication device of a plurality of communication devices, wherein the SIP message identifies a UE in a first message field and a SIP address of the communication device in a second message field (block 1010). For example, UE 710 may receive a SIP message destined for a communication device 730 of a plurality of communication devices 730 (e.g., the plurality of communication devices 730 described in connection with FIG. 9). In some aspects, the SIP message identifies UE 710 in a first message field and a SIP address of communication device 730 in a second message field. For example, the SIP message may include a SIP address of UE 710 in a TO field, and may include a SIP address of communication device 730 in a CONTACT field.

As shown in FIG. 10, in some aspects, process 1000 may include identifying the communication device as a destination for the SIP message based at least in part on the SIP address of the communication device identified in the second message field (block 1020). For example, UE 710 may identify communication device 730 as a destination for the SIP message based at least in part on the SIP address of communication device 730 identified in the second message field. For example, the SIP address of communication device 730 may be included in a CONTACT field of the SIP message, and UE 710 may obtain the SIP address from the CONTACT field to identify communication device 730 as a destination for the SIP message.

As shown in FIG. 10, in some aspects, process 1000 may include transmitting the SIP message to the communication device based at least in part on identifying the communication device as the destination for the SIP message (block 1030). For example, UE 710 may transmit the SIP message to communication device 730 based at least in part on identifying communication device 730 as the destination for the SIP message. For example, based at least in part on the SIP address of communication device 730 being included in the CONTACT field, UE 710 may use the SIP address to transmit the SIP message to communication device 730. In some aspects, UE 710 may include the SIP address of communication device 730 in the TO field before transmitting the SIP message.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a flow diagram of another example process 1100 for providing IMS services to multiple machine-type communication devices using a user equipment as a proxy, in accordance with various aspects of the present disclosure. In some aspects, one or more process blocks of FIG. 11 may be performed by one or more UEs described herein. In some aspects, one or more process blocks of FIG. 11 may be performed by another device or a plurality of devices separate from or including a UE.

As shown in FIG. 11, in some aspects, process 1100 may include receiving a message originating from a communication device, of a plurality of communication devices, and destined for a destination device (block 1110). For example, UE 710 may receive a message originating from communication device 730 of a plurality of communication devices 730 (e.g., the plurality of communication devices 730 described in connection with FIG. 9). The message may be destined for a destination device (e.g., a server device, another UE 710, another communication device 730, or the like).

As shown in FIG. 11, in some aspects, process 1100 may include generating a SIP message that identifies a SIP address of the destination device in a first message field of the SIP message and that identifies the UE in a second message field of the SIP message (block 1120). For example, UE 710 may generate a SIP message that identifies a SIP address of the destination device in a first message field of the SIP message and that identifies UE 710 in a second message field of the SIP message. For example, UE 710 may generate the SIP message to include a SIP address of the destination device in a TO field, and a SIP address of UE 710 in a FROM field. In some aspects, UE 710 may include a SIP address of communication device 730 in a CONTACT field if the SIP message is destined for communication device 730.

As shown in FIG. 11, in some aspects, process 1100 may include transmitting the SIP message to the destination device (block 1130). For example, UE 710 may transmit the SIP message to the destination device. In some aspects, UE 710 may transmit the SIP message directly to the destination device (e.g., via network 750), such as when the destination device is a communication device 730 registered with UE 710. In some aspects, UE 710 may transmit the SIP message to the destination device via IMS core network 760, such as when the destination device is not registered with UE 710.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Techniques described herein may be used to provide IMS services to multiple communication devices (e.g., multiple machine-type communication devices) using a UE as a proxy. In this way, the UE may manage SIP messaging and/or other IMS services for multiple communication devices, thereby conserving memory resources and processing resources of the communication devices. Furthermore, computing resources of an IMS registration device may be conserved because the IMS registration device manages only a single registration of a UE, rather than multiple registrations of communication devices registered with the UE. Additionally, network resources may be conserved by reducing a number of network connections that need to be established between an IMS core network and communication devices.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover: a; b; c; a and b; a and c; b and c; and a, b and c.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of wireless communication, comprising:
   receiving, by a user equipment (UE) and from a plurality of communication devices, a plurality of session initiation protocol (SIP) addresses of the plurality of communication devices,
      wherein the UE and the plurality of communication devices are associated with a unique domain; and
   registering, by the UE, the plurality of communication devices for an Internet Protocol Multimedia Subsystem (IMS) service,
      wherein the plurality of communication devices are registered using a single IMS registration of the UE, and
      wherein the UE is a proxy for performing IMS signaling for the plurality of communication devices.

2. The method of claim 1, wherein the plurality of SIP addresses are mapped to a single UE subscription, to the IMS service, associated with the UE.

3. The method of claim 1, wherein registering the plurality of communication devices comprises:
   registering the plurality of communication devices using SIP registration.

4. The method of claim 1, wherein registering the plurality of communication devices comprises:
   storing the plurality of SIP addresses and corresponding feature tags associated with the IMS service,
      wherein the corresponding feature tags identify one or more services requested by the plurality of communication devices.

5. The method of claim 1, further comprising:
   receiving a SIP message, destined for a communication device of the plurality of communication devices,
      wherein the SIP message identifies the UE in a first message field and a SIP address of the communication device in a second message field;
   identifying the communication device as a destination for the SIP message based at least in part on the SIP address of the communication device identified in the second message field; and
   transmitting the SIP message to the communication device based at least in part on identifying the communication device as the destination for the SIP message.

6. The method of claim 1, further comprising:
   receiving a message originating from a communication device, of the plurality of communication devices, and destined for a destination device;
   generating a SIP message that identifies a SIP address of the destination device in a first message field of the SIP message and that identifies the UE in a second message field of the SIP message; and
   transmitting the SIP message toward the destination device.

7. The method of claim 1, wherein the plurality of communication devices are machine-type communication devices.

8. The method of claim 1, wherein registering the plurality of communication devices permits the plurality of communication devices to communicate via peer-to-peer communication without using the UE as an intermediary.

9. A user equipment (UE) for wireless communication, comprising:
   one or more processors to:
      receive, from a plurality of communication devices, a plurality of session initiation protocol (SIP) addresses of the plurality of communication devices,
         wherein the UE and the plurality of communication devices are associated with a unique domain; and
      register the plurality of communication devices for an Internet Protocol Multimedia Subsystem (IMS) service,
         wherein the plurality of communication devices are registered using a single IMS registration of the UE, and wherein the UE is a proxy for performing IMS signaling for the plurality of communication devices.

10. The UE of claim 9, wherein the plurality of SIP addresses are mapped to a single UE subscription, to the IMS service, associated with the UE.

11. The UE of claim 9, wherein the one or more processors, when registering the plurality of communication devices, are to:
register the plurality of communication devices using SIP registration.

12. The UE of claim 9, wherein the one or more processors, when registering the plurality of communication devices, are to:
store the plurality of SIP addresses and corresponding feature tags associated with the IMS service,
wherein the corresponding feature tags identify one or more services requested by the plurality of communication devices.

13. The UE of claim 9, wherein the one or more processors are further to:
receive a SIP message, destined for a communication device of the plurality of communication devices,
wherein the SIP message identifies the UE in a first message field and a SIP address of the communication device in a second message field;
identify the communication device as a destination for the SIP message based at least in part on the SIP address of the communication device identified in the second message field; and
transmit the SIP message to the communication device based at least in part on identifying the communication device as the destination for the SIP message.

14. The UE of claim 9, wherein the one or more processors are further to:
receive a message originating from a communication device, of the plurality of communication devices, and destined for a destination device;
generate a SIP message that identifies a SIP address of the destination device in a first message field of the SIP message and that identifies the UE in a second message field of the SIP message; and
transmit the SIP message toward the destination device.

15. The UE of claim 9, wherein the plurality of communication devices are machine-type communication devices.

16. A non-transitory computer-readable medium storing instructions for wireless communication, the instructions comprising:
one or more instructions that, when executed by one or more processors of a user equipment (UE), cause the one or more processors to:
receive, from a plurality of communication devices, a plurality of session initiation protocol (SIP) addresses of the plurality of communication devices,
wherein the UE and the plurality of communication devices are associated with a unique domain; and
register the plurality of communication devices for an Internet Protocol Multimedia Subsystem (IMS) service,
wherein the plurality of communication devices are registered using a single IMS registration of the UE, and
wherein the UE is a proxy for performing IMS signaling for the plurality of communication devices.

17. The non-transitory computer-readable medium of claim 16, wherein the plurality of SIP addresses are mapped to a single UE subscription, to the IMS service, associated with the UE.

18. The non-transitory computer-readable medium of claim 16, wherein the one or more instructions, that cause the one or more processors to register the plurality of communication devices, cause the one or more processors to:
register the plurality of communication devices using SIP registration.

19. The non-transitory computer-readable medium of claim 16, wherein the one or more instructions, that cause the one or more processors to register the plurality of communication devices, cause the one or more processors to:
store the plurality of SIP addresses and corresponding feature tags associated with the IMS service,
wherein the corresponding feature tags identify one or more services requested by the plurality of communication devices.

20. The non-transitory computer-readable medium of claim 16, wherein the one or more instructions, when executed by the one or more processors, cause the one or more processors to:
receive a SIP message, destined for a communication device of the plurality of communication devices,
wherein the SIP message identifies the UE in a first message field and a SIP address of the communication device in a second message field;
identify the communication device as a destination for the SIP message based at least in part on the SIP address of the communication device identified in the second message field; and
transmit the SIP message to the communication device based at least in part on identifying the communication device as the destination for the SIP message.

21. The non-transitory computer-readable medium of claim 16, wherein the one or more instructions, when executed by the one or more processors, cause the one or more processors to:
receive a message originating from a communication device, of the plurality of communication devices, and destined for a destination device;
generate a SIP message that identifies a SIP address of the destination device in a first message field of the SIP message and that identifies the UE in a second message field of the SIP message; and
transmit the SIP message toward the destination device.

22. The non-transitory computer-readable medium of claim 16, wherein the plurality of communication devices are machine-type communication devices.

23. An apparatus for wireless communication, comprising:
means for receiving a plurality of session initiation protocol (SIP) addresses of a plurality of communication devices from the plurality of communication devices,
wherein the apparatus and the plurality of communication devices are associated with a unique domain; and
means for registering the plurality of communication devices for an Internet Protocol Multimedia Subsystem (IMS) service,
wherein the plurality of communication devices are registered using a single IMS registration of the apparatus, and wherein the apparatus is a proxy for performing IMS signaling for the plurality of communication devices.

24. The apparatus of claim 23, wherein the plurality of SIP addresses are mapped to a single subscription, to the IMS service, associated with the apparatus.

25. The apparatus of claim 23, wherein the means for registering the plurality of communication devices comprises:
means for registering the plurality of communication devices using SIP registration.

26. The apparatus of claim 23, wherein the means for registering the plurality of communication devices comprises:
means for storing the plurality of SIP addresses and corresponding feature tags associated with the IMS service,
wherein the corresponding feature tags identify one or more services requested by the plurality of communication devices.

27. The apparatus of claim 23, further comprising:
means for receiving a SIP message, destined for a communication device of the plurality of communication devices,
wherein the SIP message identifies the apparatus in a first message field and a SIP address of the communication device in a second message field;
means for identifying the communication device as a destination for the SIP message based at least in part on the SIP address of the communication device identified in the second message field; and
means for transmitting the SIP message to the communication device based at least in part on identifying the communication device as the destination for the SIP message.

28. The apparatus of claim 23, further comprising;
means for receiving a message originating from a communication device, of the plurality of communication devices, and destined for a destination device;
means for generating a SIP message that identifies a SIP address of the destination device in a first message field of the SIP message and that identifies the apparatus in a second message field of the SIP message; and
means for transmitting the SIP message toward the destination device.

29. The apparatus of claim 23, wherein the plurality of communication devices are machine-type communication devices.

30. The apparatus of claim 23, wherein the means for registering the plurality of communication devices permits the plurality of communication devices to communicate via peer-to-peer communication without using the apparatus as an intermediary.

* * * * *